(12) United States Patent
Iwasaki

(10) Patent No.: US 7,681,920 B2
(45) Date of Patent: Mar. 23, 2010

(54) STRADDLE-TYPE VEHICLE

(75) Inventor: Yusuke Iwasaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 91 days.

(21) Appl. No.: 11/552,086

(22) Filed: Oct. 23, 2006

(65) Prior Publication Data

US 2007/0089922 A1 Apr. 26, 2007

(30) Foreign Application Priority Data

Oct. 24, 2005 (JP) ............................. 2005-309142

(51) Int. Cl.
*B60P 3/22* (2006.01)

(52) U.S. Cl. .................. 280/831; 280/833; 280/834; 180/219

(58) Field of Classification Search .................. 180/219, 180/225; 280/831, 833, 834
See application file for complete search history.

(56) References Cited

U.S. PATENT DOCUMENTS

| | | | | |
|---|---|---|---|---|
| 5,094,315 A | * | 3/1992 | Taki et al. .................. | 180/219 |
| RE34,072 E | * | 9/1992 | Asakura et al. ............. | 180/68.3 |
| 5,284,221 A | * | 2/1994 | Warne ......................... | 180/219 |
| 5,388,660 A | * | 2/1995 | Shirasagi et al. ............ | 180/219 |
| 6,341,792 B1 | * | 1/2002 | Okuma ....................... | 280/304.3 |
| 6,523,634 B1 | * | 2/2003 | Gagnon et al. ............. | 180/291 |
| 6,805,214 B2 | * | 10/2004 | Maeda et al. ............... | 180/69.4 |
| 2005/0126546 A1 | * | 6/2005 | Yagisawa .................... | 123/509 |
| 2006/0066092 A1 | * | 3/2006 | Miyabe ....................... | 280/833 |
| 2007/0169975 A1 | * | 7/2007 | Kubota ....................... | 180/69.4 |
| 2007/0175688 A1 | * | 8/2007 | Ishii et al. ................... | 180/219 |

FOREIGN PATENT DOCUMENTS

| JP | 05238456 A | * | 9/1993 |
|---|---|---|---|
| JP | 2004-182018 | | 7/2004 |

* cited by examiner

*Primary Examiner*—Lesley Morris
*Assistant Examiner*—Tashiana Adams
(74) *Attorney, Agent, or Firm*—Keating & Bennett, LLP

(57) ABSTRACT

A straddle-type vehicle with improved protection of a discharge part on a fuel tank. A seat is at least partially arranged above a fuel tank and is fitted on a front load receiving part and a rear load receiving part which are arranged on the fuel tank apart from each other in the front and rear direction of the vehicle. A fuel pump unit has a discharge part for discharging fuel in the fuel tank and supplying the fuel in to an engine. The discharge part is arranged on the fuel tank between the front load receiving part and the rear load receiving part.

8 Claims, 21 Drawing Sheets

STRADDLE-TYPE VEHICLE

RELATED APPLICATIONS

This application claims the benefit of priority under 35 USC 119 of Japanese patent application no. 2005-309142, filed on Oct. 24, 2005, which application is hereby incorporated by reference in its entirety.

BACKGROUND OF THE INVENTION

1. Field of the Invention

The present invention relates to a straddle-type vehicle having a fuel tank in which a fuel pump is housed and, in particular, relates to a discharge part of the fuel pump.

2. Description of Related Art

In a conventional straddle-type vehicle, such as that described in JP-A-2004-182018, a discharge pipe of a fuel pump housed in a fuel tank arranged below a seat projects above the fuel tank, and the load of the seat is received only on a side closer than the fuel tank discharge pipe to the rear end of the vehicle.

In such a vehicle, since the part receiving the load applied to the seat is only on a side closer than the discharge pipe to the rear end of the vehicle, when the front side of the seat is deflected down by the load, the discharge pipe is likely to be insufficiently protected from the seat deflection.

SUMMARY OF THE INVENTION

The present invention has been made in view of this problem and provides a straddle-type vehicle with improved protection of the discharge part on the fuel tank.

To solve the problem described above, a straddle-type vehicle according to one embodiment of the invention includes a fuel tank; a seat at least partially arranged above the fuel tank and fitted on a front load receiving part and a rear load receiving part that are arranged on the fuel tank apart from each other in the front and rear direction of the vehicle. A fuel pump unit has a discharge part for discharging fuel in the fuel tank and supplying the fuel to an engine. The discharge part is located between the front load receiving part and the rear load receiving part.

According to the present invention, improved protection of the discharge part arranged on the fuel tank is provided. A straddle-type vehicle according to the present invention includes, for example, a motorcycle (including a bicycle mounted with an electric motor), a four-wheel buggy, a snow mobile, and the like.

According to one mode of the present invention, at least one of the front load receiving part and the rear load receiving part may have a plurality of partial load receiving parts arranged apart from each other in the vehicle width direction. This is advantageous in that the plurality of partial load receiving parts receives a load to the seat in the vehicle width direction with reliability, so the discharge part is protected effectively.

Moreover, according to one mode of the present invention, the discharge part is located between the plurality of partial load receiving parts in the vehicle width direction. This is advantageous in that the discharge part is protected effectively from a load to one side of the seat in the vehicle width direction.

Further, according to one mode of the present invention, the plurality of partial load receiving parts are arranged side by side on the fuel tank in the vehicle width direction. This is advantageous in that the front load or rear load receiving part having the plurality of partial load receiving parts receives a load to the seat in the vehicle width direction with reliability, so that the discharge part is protected effectively.

Still further, according to one mode of the present invention, the fuel tank has a raised part formed at a position that corresponds to at least one of the front load receiving part and the rear load receiving part. This is advantageous in that the rigidity of the surface of the fuel tank that receives a load to the seat via the front load receiving part or the rear load receiving part is enhanced and the discharge part is protected effectively.

Still further, according to one mode of the present invention, a front support part for supporting the seat is arranged at a position closer to the front of the vehicle than the front load receiving part and a rear support part for supporting the seat is arranged at a position closer to the rear of the vehicle than the rear load receiving part. This is advantageous in that the seat is supported not only by the front load receiving part and the rear load receiving part but also by the top surfaces of the front support part and the rear support part, so the discharge part arranged below the seat is protected effectively.

Still further, according to one mode of the present invention, the fuel tank has a fuel supply port arranged on the fuel tank between the front load receiving part and the rear load receiving part. This is advantageous in that the protection of the fuel supply port is also improved.

Still further, according to one mode of the present invention, the top surface of the fuel supply port part is higher than the top surface of the discharge part. This is advantageous in that the discharge part is further protected effectively by the fuel supply port part having a higher rigidity than the discharge part.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An exemplary embodiment of a straddle-type vehicle according to the present invention is now described with reference to the drawings. In this embodiment, the straddle-type vehicle is realized as a motorcycle.

Figure 1:
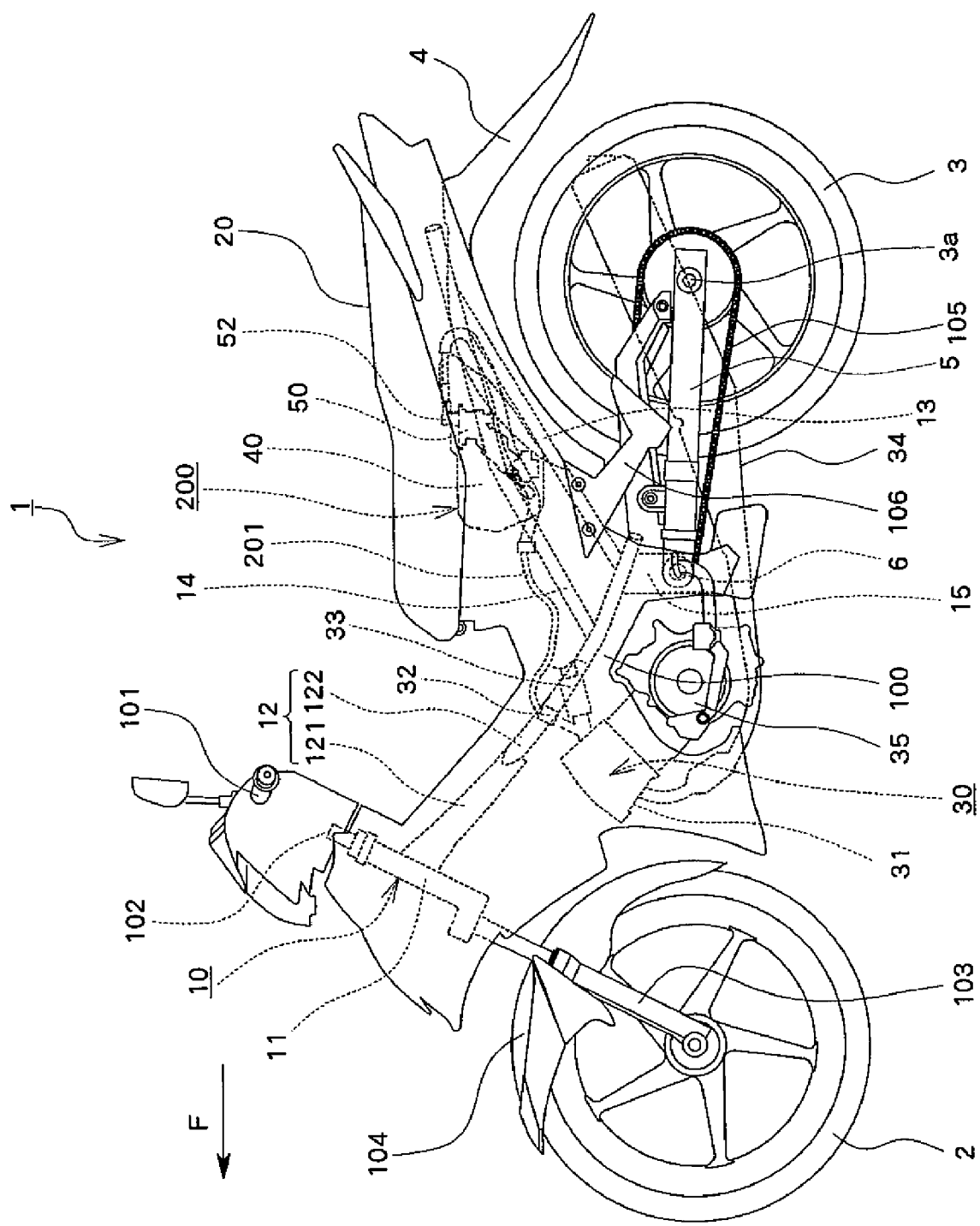
FIG. 1 is a left side view of a motorcycle according to one embodiment of the invention.

FIG. 1 is a left side view of a motorcycle 1 according to this embodiment. A direction in which motorcycle 1 travels (direction indicated by arrow F in the drawing) is referred to as "forward direction" of the vehicle and the left and right direction of the vehicle is referred to as "direction of the width of the vehicle". Moreover, the length in the up and down direction of the vehicle is referred to as "height".

Motorcycle 1 includes a vehicle body frame 10 forming the skeleton of the vehicle body; a front wheel 2 steered by a handlebar 101; a rear wheel 3 supported by rear arms 5 in such a way as to be able to swing up and down; a seat 20 on which a rider sits; a fuel injection type engine 30; and a fuel tank 40 for storing fuel.

The front part of vehicle body frame 10 is a head pipe 11 slanting downward and forward. A steering shaft 102 having handlebar 101 coupled to its top end is turnably passed through head pipe 11. The shaft of front wheel 2 is rotatably supported by the bottom ends of a pair of left and right front forks 103 extending downward of steering shaft 102. A front fender 104 is arranged over and covers the top surface of front wheel 2.

Body frame 10 has a main frame 12 including: one first main frame 121 having its front end coupled to head pipe 11 and extending above cylinder part 31 of engine 30; and a pair of left and right second main frames 122 slanting rearward and downward between front wheel 2 and rear wheel 3 from the rear end of first main frame 121.

Body frame 10 also has a pair of left and right rear arm brackets 15 having their top ends coupled to and extending downward from rear end parts of left and right second main frames 122. Left and right rear arms 5, which extend in a front and rear direction and rotatably support the shaft of rear wheel 3 rotatably by their rear end parts, have their respective front end parts turnably supported by a pivot shaft 6 outside left and right rear arm brackets 15 in the direction of the width of the vehicle. As a result, rear arms 5 support rear wheel 3 by their rear end parts so that rear wheel 3 can swing up and down. A rear fender 4 curved along the shape of rear wheel 3 in the direction of the width of vehicle and in the front and rear direction is arranged above rear wheel 3.

Body frame 10 also has a rear frame including: a pair of left and right back stays 13 coupled at their front ends to the rear end parts of second main frames 122 above pivot shaft 6 and rear arm 5 and slanting rearward and upward; and a pair of left and right seat rails 14 coupled at their front ends to parts of second main frames 122 above back stays 13 and slanting rearward and upward for supporting seat 20. Back stays 13 and seat rails 14 extend between seat 20 and rear wheel 3.

Seat 20 is a tandem seat on which two riders can sit in tandem in the front and rear direction. A central part in the front and rear direction of seat 20 is arranged above fuel tank 40 and a rear part thereof is arranged above rear wheel 3.

Fuel tank 40 is arranged below seat 20. The rear part of fuel tank 40 is arranged above a part closer to the front than rotary shaft 3a of rear wheel 3. Moreover, a part of a fuel pump unit 50 for supplying fuel in fuel tank 40 to engine 30 is arranged in fuel tank 40. That is, motorcycle 1 has a fuel tank assembly 200 including fuel tank 40 and fuel pump unit 50 mounted below seat 20.

Fuel pump unit 50 has a discharge part 52 for discharging fuel in fuel tank 40 to the outside of fuel tank 40. Discharge part 52 is arranged above fuel tank 40. Fuel discharged from discharge part 52 is supplied to engine 30 through a fuel hose 201.

Engine 30 is arranged forward of pivot shaft 6 and below second main frames 122 between front wheel 2 and rear wheel 3. Engine 30 is preferably a single-cylinder four-cycle engine and includes: a cylinder part 31 for housing a piston; a crank part (not shown) for housing a crankshaft; and a clutch part (not shown) for housing a clutch mechanism. The left side in the vehicle width direction of the crank part and the right side in the vehicle width direction of the clutch part are covered, respectively, with a crankcase 35 and a clutch cover (not shown). The front end parts of rear arms 5 are rotatably supported between crankcase 35 and rear wheel 3 and between the clutch cover (not shown) and rear wheel 3 by rear arm brackets 15.

Cylinder part 31 slants upward and forward from the crank part. Coupled to cylinder part 31 are an injector 32 for injecting fuel sent through fuel hose 201 from fuel pump unit 50 into cylinder part 31, and a throttle body 33 for supplying air sucked from an air cleaner (not shown) and mixed with the fuel. A muffler 34 arranged on the right side of the vehicle body and extending rearward is coupled to cylinder part 31 through an exhaust pipe.

Injector 32 is electronically controlled and injects fuel into cylinder part 31 according to the degree of opening of throttle body 33. Engine 30 combusts fuel supplied by injector 32 to generate a driving force. This driving force is transmitted to rear wheel 3 via a chain 105 arranged on the left side of the vehicle body. As a result, rear wheel 3 is rotated to move motorcycle 1.

Motorcycle 1 is provided with a vehicle cover 100 for covering a left side except for crankcase 35, a part between seat 20 and rear wheel 3, and the like, of the vehicle body. Most parts of body frame 10, cylinder part 31 of engine 30, injector 32, throttle body 33, fuel hose 201, and fuel tank assembly 200 are arranged in vehicle cover 100.

Left and right rear foot rest brackets 106 are fixed to left and right back stays 13. That is, left and right bracket members (not shown) are fixed to left and right back stays 13 rearward of crankcase 35 and above rear arms 5, and top end parts of left and right rear foot rest brackets 106 are fixed to the left and right bracket members. Rear foot rest brackets 106 slant downward and rearward on from their upper ends and their bottom ends are arranged outside in the vehicle width direction of rear arms 5.

Motorcycle 1 has a stand mounted on the left side (not shown) that supports the vehicle body on the slant. Motorcycle 1 also has an electric system including a generator for supplying electric power, electric wiring, and the like mounted mainly on the right side of the vehicle body, and a fuel supply system including fuel pump unit 50, fuel hose 201, and the like mounted mainly on the left side of the vehicle body.

Figure 2:
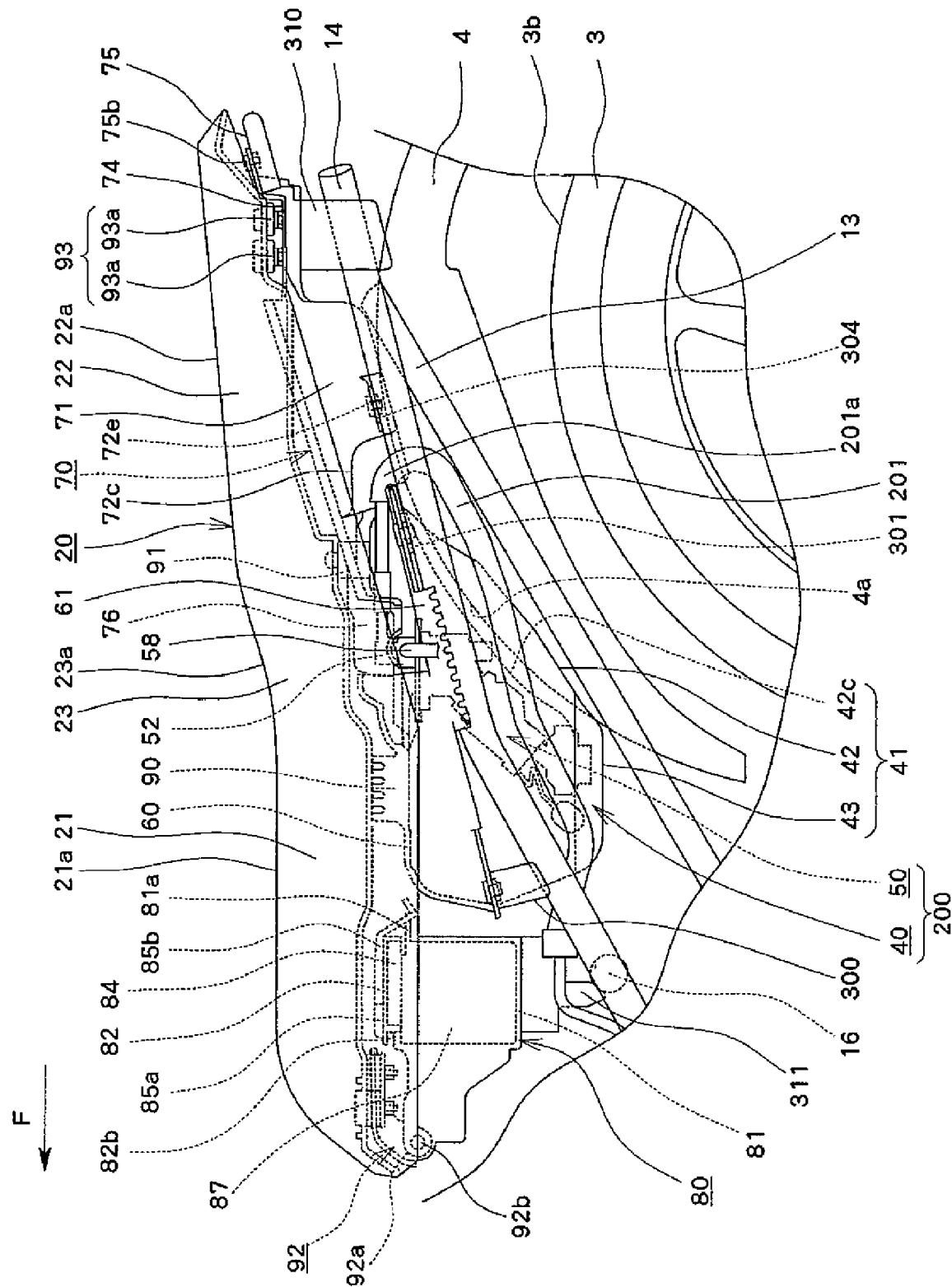
FIG. 2 is an enlarged left side view of a rear part of a vehicle body of the motorcycle of FIG. 1.
Figure 3:
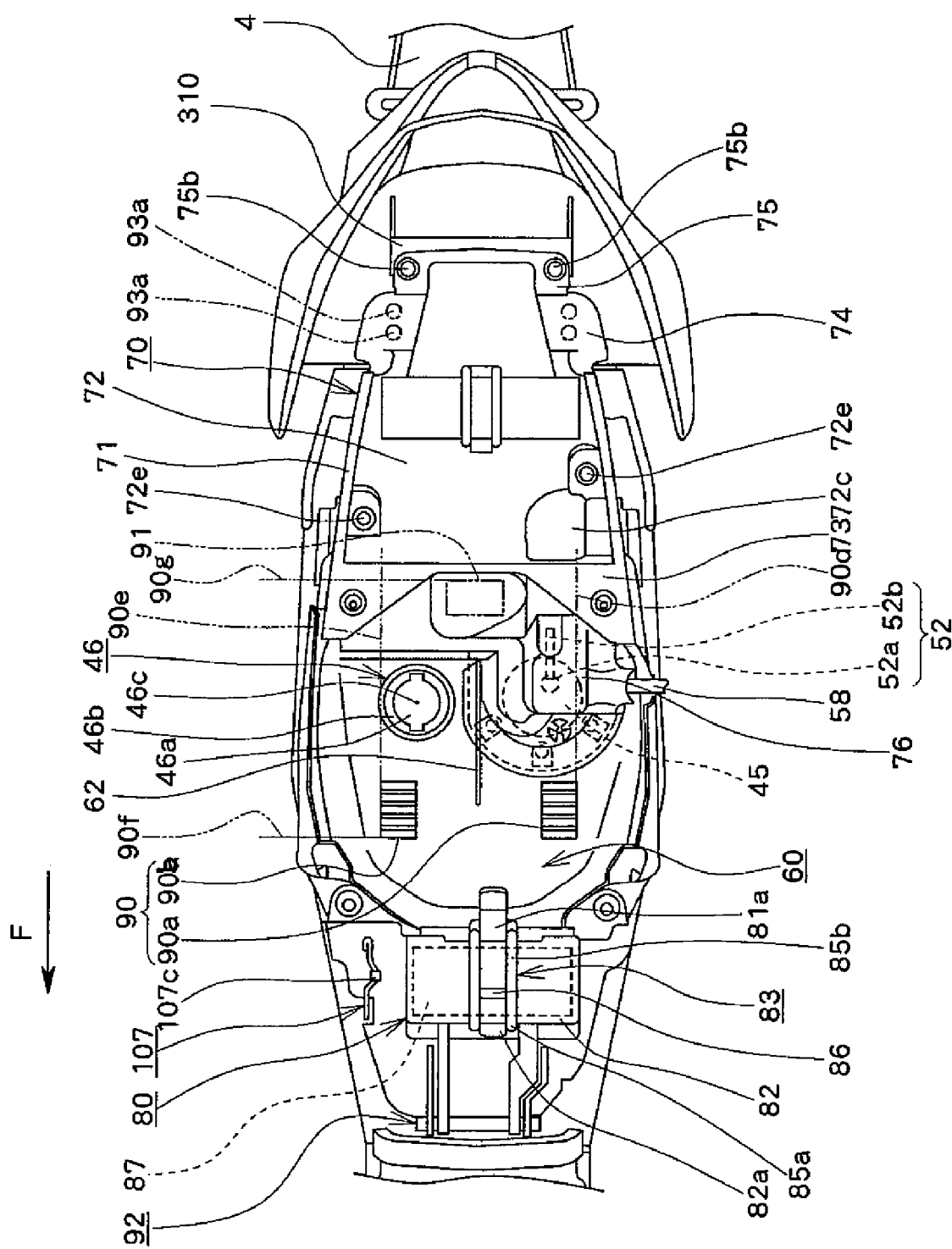
FIG. 3 is a plan view of the rear part of the vehicle body of the motorcycle of FIG. 1.

FIG. 2 is a left side view of the rear part of the vehicle body of motorcycle 1 with vehicle cover 100 removed. FIG. 3 is a plan view of the rear part of the vehicle body of motorcycle 1 with seat 20 removed.

Under seat 20 are a battery case 80 for holding a battery 87; a fuel tank assembly 200 having fuel tank 40 and fuel pump unit 50; a tank cover 60 for covering a part of the upper part of fuel tank assembly 200; and a protection member 70 having a pump cover part 76 for protecting discharge part 52 of fuel pump unit 50 arranged above fuel tank 40.

The approximate front half of seat 20 is a first sitting part 21 and the approximate rear half of seat 20 is a second sitting part 22. Top surface 21a of first sitting part 21 is nearly horizontal in the front and rear direction. Top surface 22a of second sitting part 22 is higher than top surface 21a of first sitting part 21 and is slanted rearward and upward at a nearly constant gradient. First sitting part 21 is arranged forward of rear wheel 3 and second sitting part 22 is arranged above rear wheel 3 and rear fender 4.

A middle part 23 of seat 20 connects first sitting part 21 and second sitting part 22 and has a top surface 23a slanted rearward and upward at a nearly constant gradient larger than that of top surface 22a of second sitting part 22. Middle part 23 is arranged above rear wheel 3 and rear fender 4.

Seat 20 is set on a front load receiving part 90 arranged below the rear part of first sitting part 21 and on a rear load receiving part 91 arranged below the front part of second sitting part 22. Front load receiving part 90 includes a left front load receiving part 90a and a right front load receiving part 90b arranged side by side with a space between them on the left and right sides in the vehicle width direction. Front load receiving parts 90a and 90b are arranged at the same positions in the front and rear direction. By contrast, rear load receiving part 91 is arranged near the center in the vehicle width direction at a position closer to the rears of front load receiving parts 90a and 90b.

Front load receiving parts 90a and 90b and rear load receiving part 91 are damper parts made of rubber and are for absorbing impacts to seat 20. Front load receiving parts 90a and 90b project upward from the fuel tank 40 side and rear load receiving part 91 project downward from the seat 20 side. That is, front load receiving parts 90a and 90b are integrally formed with and project from tank cover 60 and rear load receiving part 91 projects from the bottom surface of seat 20.

When seat 20 is deflected downward, for example, by a load, front load receiving parts 90a and 90b and rear load receiving part 91 are pressed onto and between the deflected seat 20 and fuel tank 40 and are elastically deformed and reduced slightly in length in the up and down direction, thereby receiving the load applied to seat 20. That is, left and right front load receiving parts 90a and 90b receive mainly a load of first sitting part 21 applied to the left and right side parts in the vehicle width direction, and rear load receiving part 91 receives mainly the load applied to second sitting part 22.

Thus, when a driver sits on first sitting part 21 and a passenger sits on second sitting part 22, front load receiving part 90 and rear load receiving part 91 mainly receive, respectively, a load applied by the driver and a load applied by the passenger. In this manner, the load applied to seat 20 is received mainly by three points of left front load receiving part 90a, right front load receiving part 90b, and rear load receiving part 91. A space sandwiched between front load receiving part 90 and rear load receiving part 91 is formed below middle part 23 between middle part 23 and fuel tank 40 and, as will be described later, discharge part 52 is arranged in a projecting manner in this space.

Front load receiving part 90 and rear load receiving part 91 are arranged on fuel tank 40. That is, left and right front load receiving parts 90a and 90b are arranged on the front part of a surface of fuel tank 40 opposite to seat 20 and rear load receiving part 91 is arranged on the rear part of the surface.

Front support part 92 is arranged forward of fuel tank 40 and below a front end part of seat 20 and supports the front end part from the lower side. A rear support part 93 is arranged rearward of fuel tank 40 and below a rear end part of seat 20 and supports the rear end part from the lower side.

Front support part 92 has a hinge part 92a for turnably supporting the shaft of the front end part of seat 20. Hinge part 92a has a hinge shaft 92b extending in the vehicle width direction. Seat 20 has its front end part turned around hinge shaft 92b so that it can be moved up and down to be opened and closed.

Rear support part 93 has four projecting parts 93a projecting down from the bottom surface of the rear end part of seat 20. Two projecting parts 93a are fitted in tandem in a projecting manner to the left end in the vehicle width direction of the rear end part of seat 20 and the other two projecting parts 93a are fitted in tandem in a projecting manner to the right end in the vehicle width direction of the rear end part of seat 20. Their bottom ends abut against a part of protection member 70, thereby supporting the rear end part of seat 20.

In this manner, seat 20 is fitted on front support part 92, rear support part 93, front load receiving part 90, and rear load receiving part 91. That is, the front end of seat 20 is supported by front support part 92 and the rear end is supported by rear support part 93, and a central part in the front and rear direction that is easily deflected down by load is supported from below by front load receiving part 90 and rear load receiving part 91. As a result, first sitting part 21 of seat 20 is fitted on front support part 92 and front load receiving part 90 and second sitting part 22 of seat 20 is fitted on rear load receiving part 91 and rear support part 93. The distance in the front and rear direction between front load receiving part 90 and rear load receiving part 91 is smaller than both the distance between front load receiving part 90 and front support part 92 and the distance between rear load receiving part 91 and rear support part 93.

Figure 4:
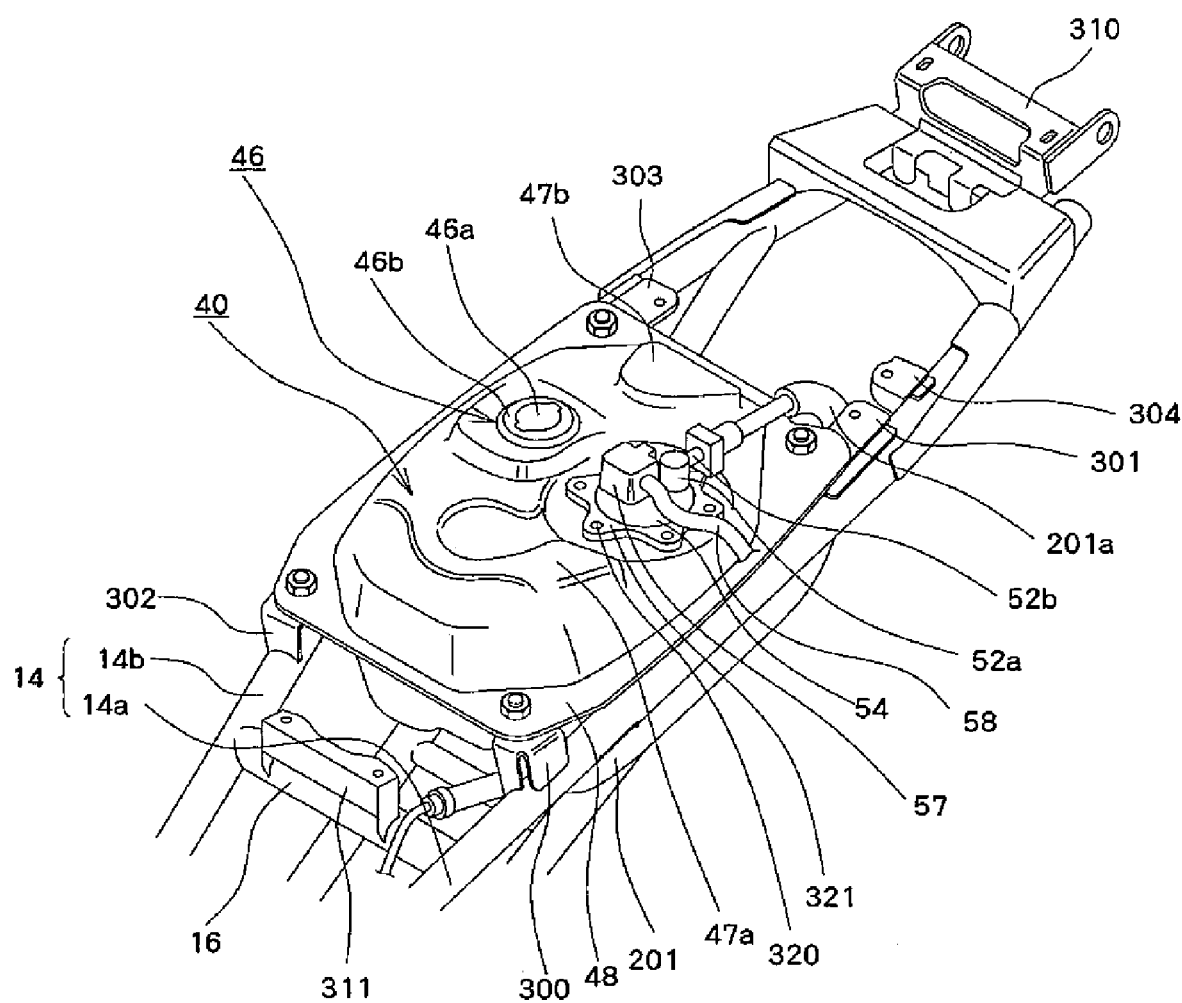
FIG. 4 is a perspective view of a fuel tank assembly mounted on the vehicle body of the motorcycle of FIG. 1.
Figure 5:
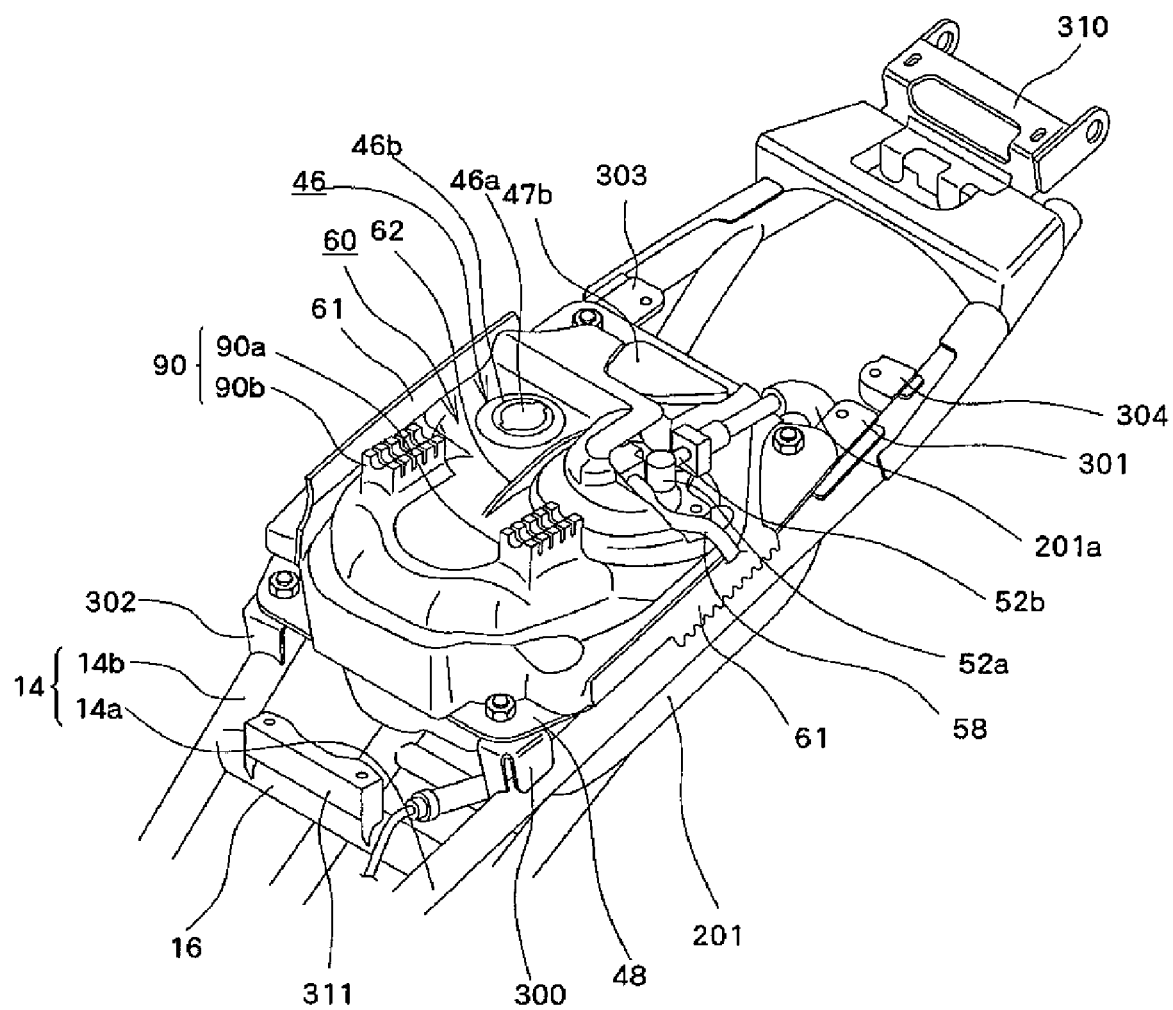
FIG. 5 is a perspective view of a state where a tank cover is further mounted on the vehicle body shown in FIG. 4.
Figure 6:
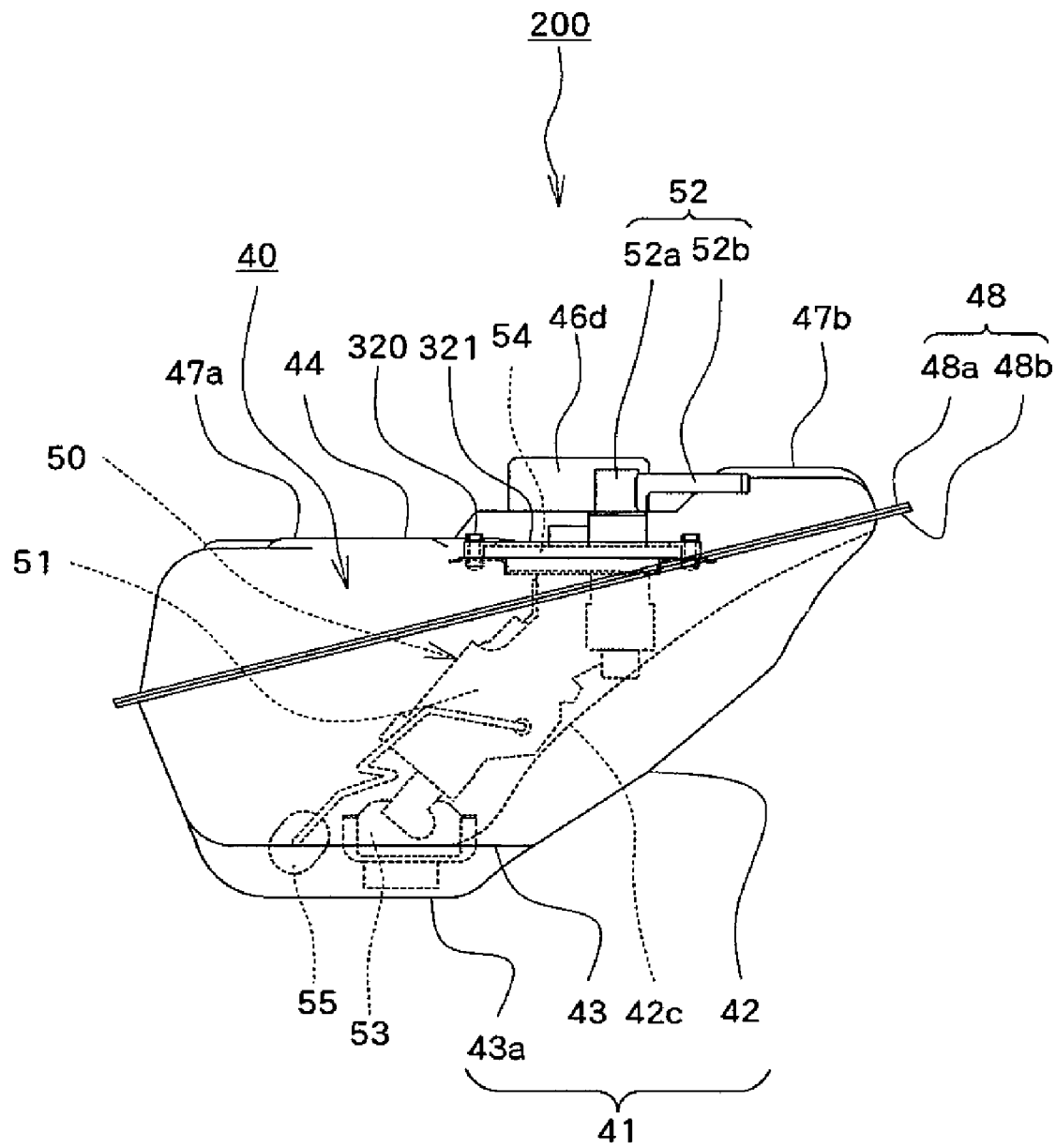
FIG. 6 is a left side view of a fuel assembly according to the invention.
Figure 7:
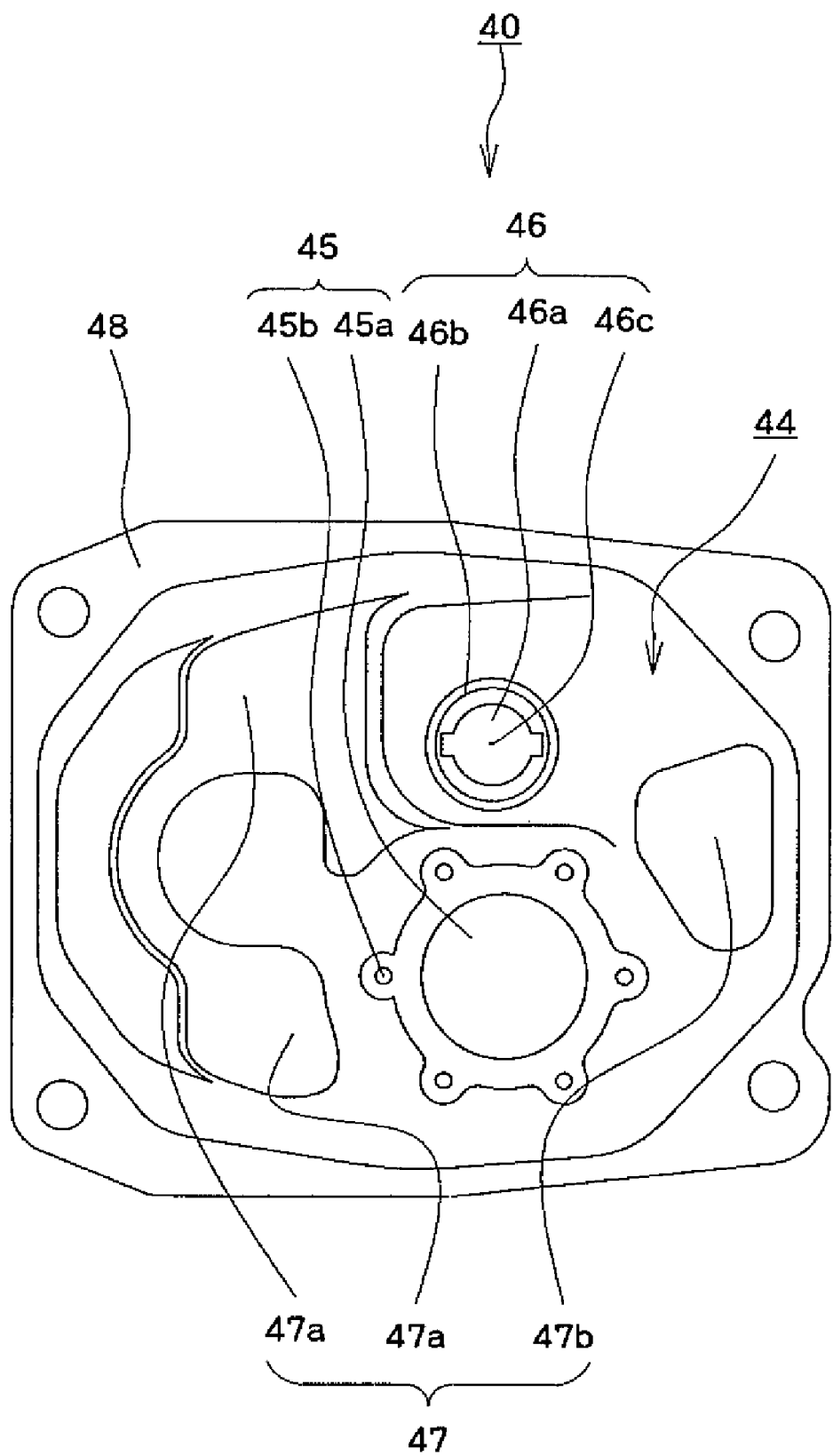
FIG. 7 is a plan view of a fuel tank according to the invention.
Figure 8:
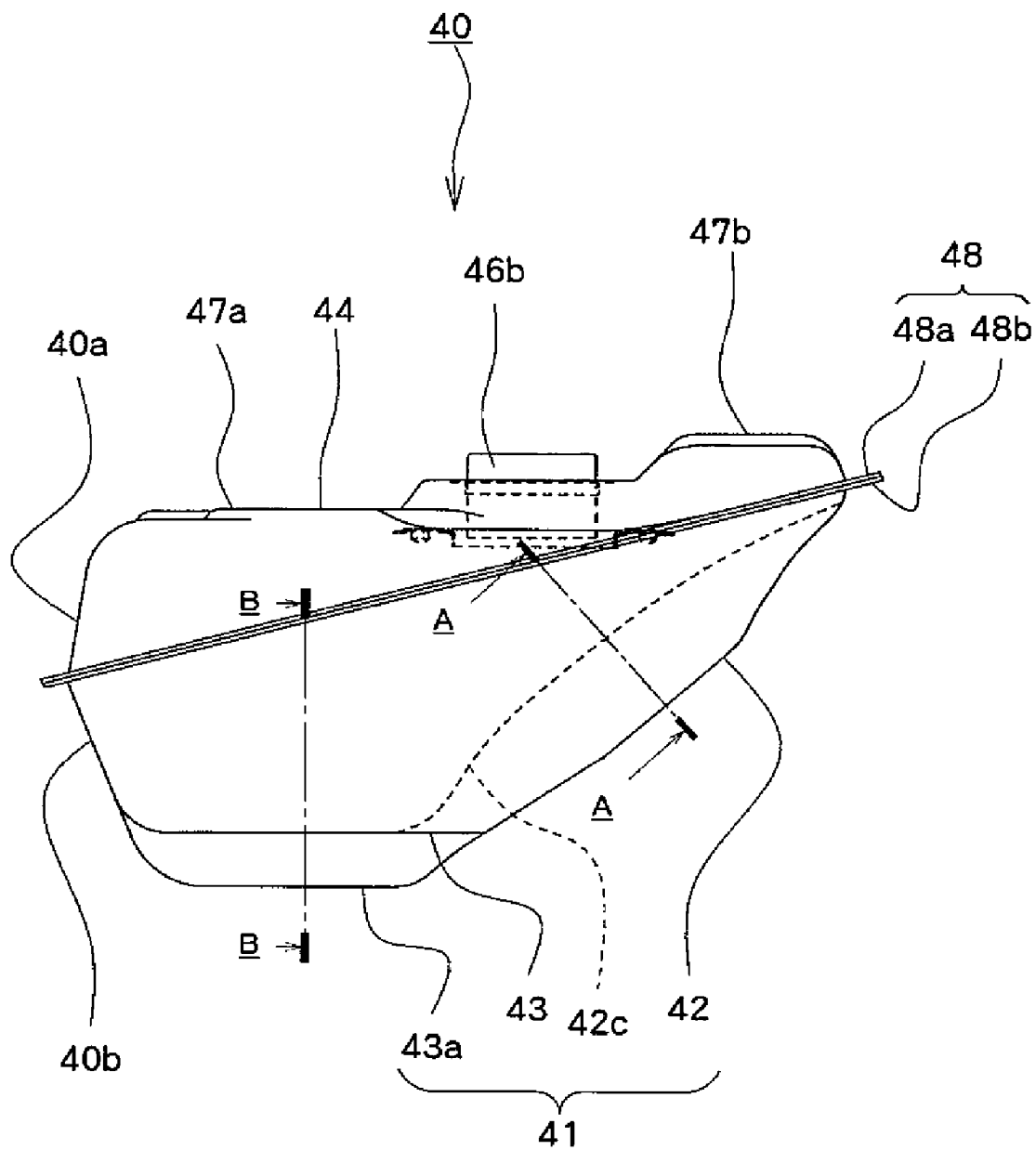
FIG. 8 is a left side view of the fuel tank of FIG. 7.
Figure 9:
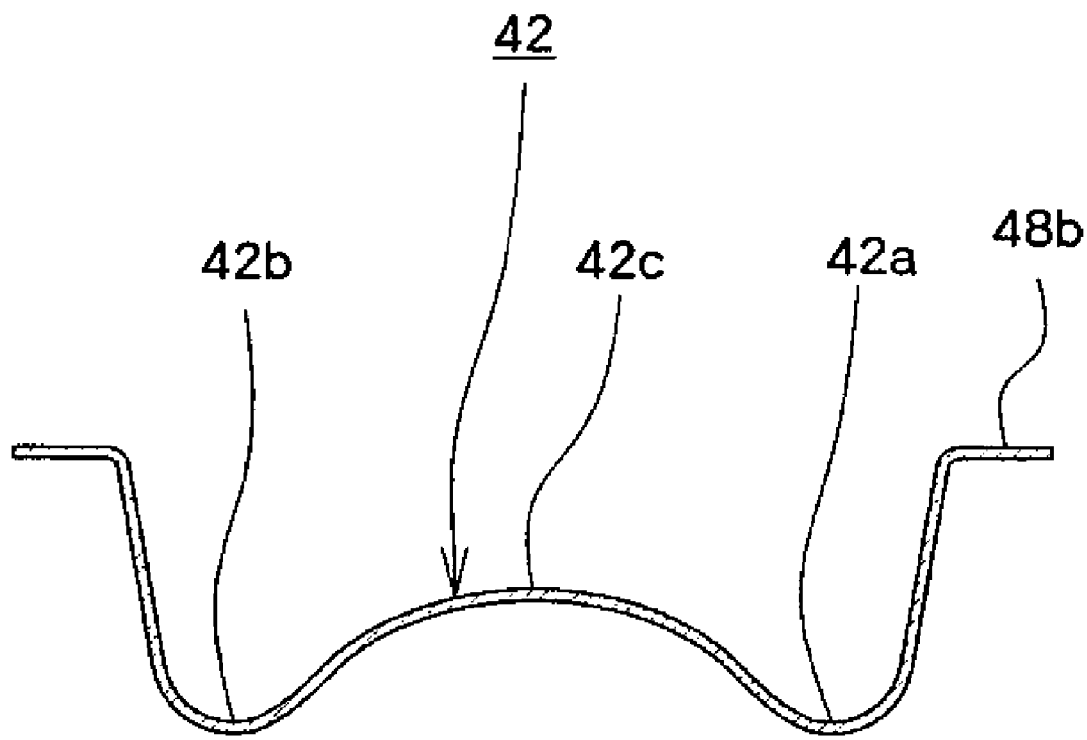
FIG. 9 is a cross-sectional view of a bottom part of the fuel tank taken along ling A-A of FIG. 8.
Figure 10:
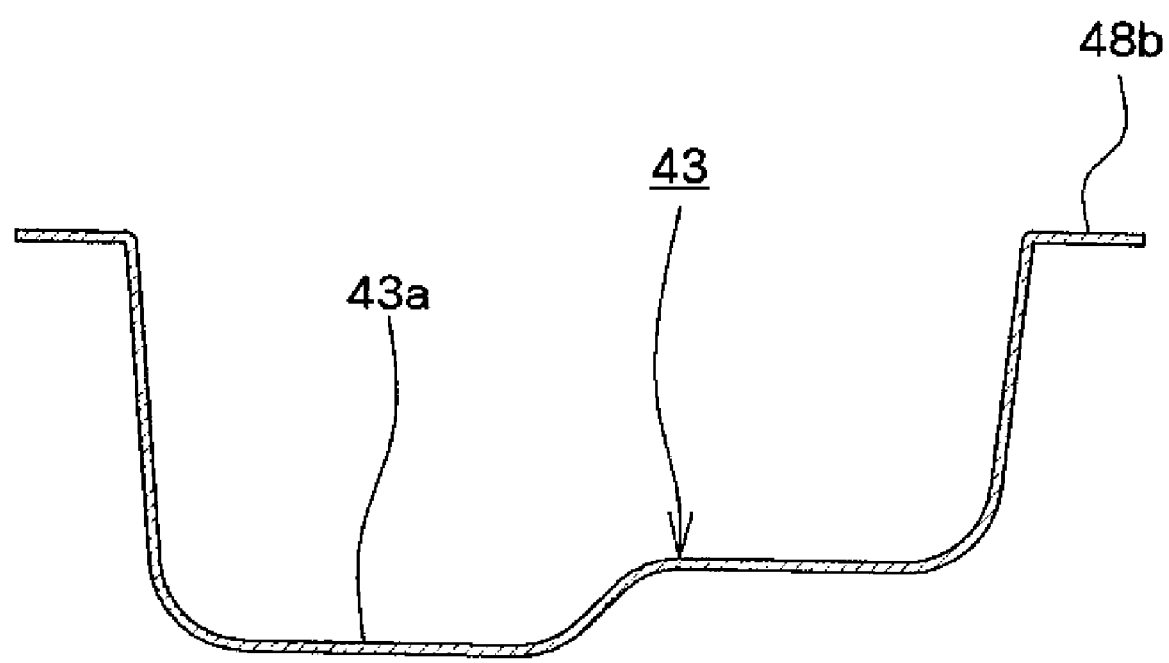
FIG. 10 is a cross-sectional view of the bottom part of the fuel tank taken along line B-B of FIG. 8.
Figure 11:
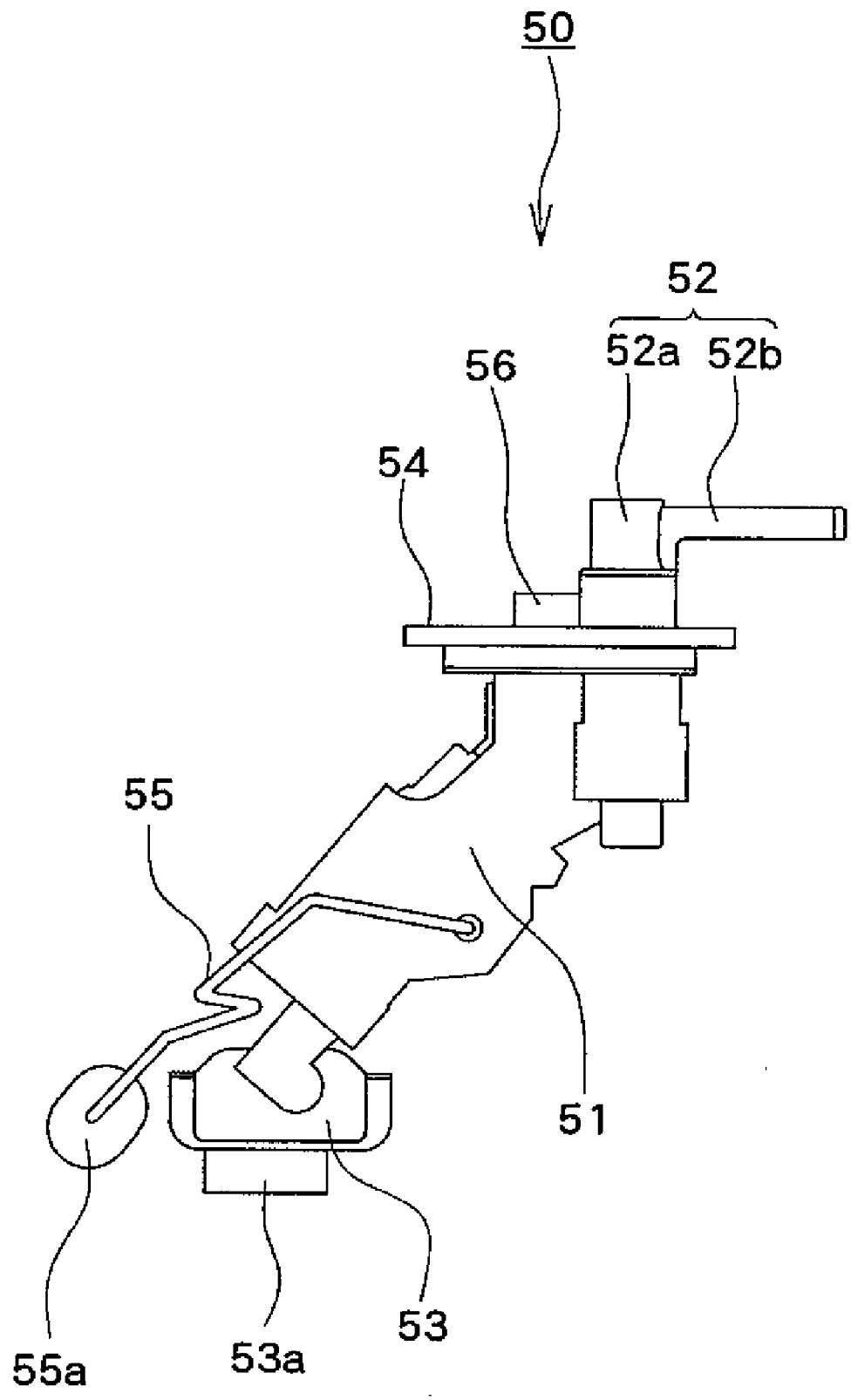
FIG. 11 is left side view of a fuel pump unit according to the invention.
Figure 12:
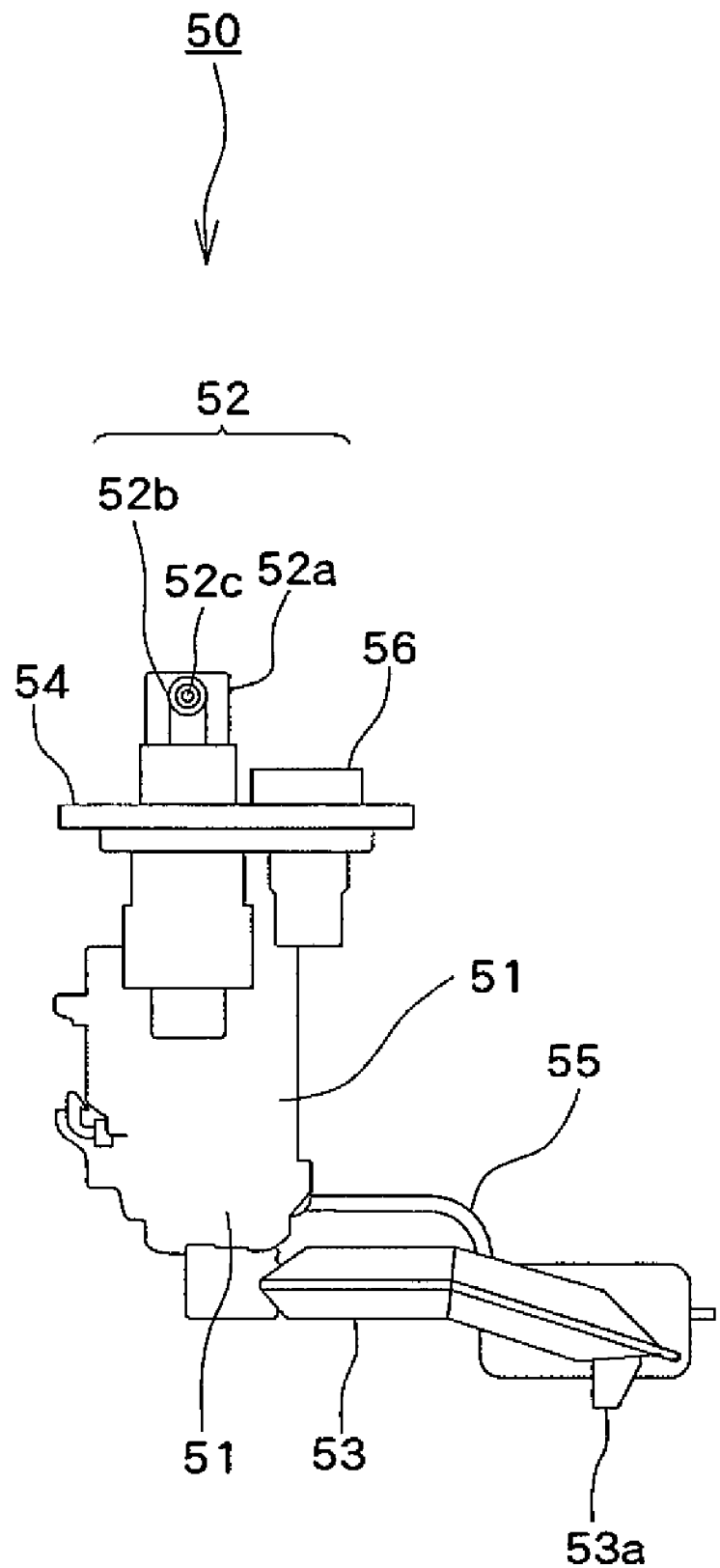
FIG. 12 is rear view of the fuel pump unit of FIG. 11.

Next, fuel tank assembly 200 is described in detail. FIG. 4 is a perspective view of fuel tank assembly 200 fitted to the vehicle body. For the convenience of description, FIG. 4 shows a state where seat 20, battery case 80, tank cover 60, protection member 70, and vehicle cover 100 are removed. FIG. 5 is a perspective view in a state where tank cover 60 is fitted on the vehicle body of FIG. 4. FIG. 6 is a left side view of fuel tank assembly 200. FIGS. 7 and 8 are a plan view and a left side view, respectively, of fuel tank 40. FIGS. 9 and 10 are cross-sectional views of bottom part 41 of fuel tank 40 taken, respectively, along line A-A and line B-B of FIG. 8. FIGS. 11 and 12 are a left side view and a rear view, respectively, of fuel pump unit 50.

Fuel tank 40 comprises bottom part 41, which is a lower part of an outside wall, and a top surface part 44, which is an upper part of the outside wall. Fuel tank 40 has a plate-shaped collar part 48 surrounding its outside surface. Fuel tank 40 is assembled by fixing its upper part 40a to a separately-formed lower part 40b by fixing collar part 48a of upper part 40a to collar part 48a of lower part 40b. Collar parts 48a are slanted forward and downward in the front and rear direction along left and right seat rails 14a and 14b.

Bottom part 41 of fuel tank 40 includes a slant or inclined part 42 that slants or inclines forward and downward from the rear end of top surface part 44. Slant part 42 is arranged above a part of rear wheel 3 and rear fender 4 that is closer to the front than is rotary shaft 3a of rear wheel 3 (refer to FIG. 2).

Slant part 42 is curved to cover top surface 3b of rear wheel 3 and top surface 4a of rear fender 4 arranged below slant-part 42 (refer to FIG. 2) in the vehicle width direction and in the front and rear direction. That is, slant part 42 is formed in the shape of a saddle curved to extend astride rear wheel 3 and rear fender 4, which are arranged below slant part 42, in the vehicle width direction. As shown in FIG. 9, a central part 42c in the vehicle width direction of slant part 42 is convex upward along a curved shape of top surface 3b of rear wheel 3 and top surface 4a of rear fender 4, which are arranged below slant part 42 (refer to FIG. 2). Further, slant part 42 has a left depressed part 42a and a right depressed part 42b, which are formed as depressions shaped convexly downward, on the left end and the right end in the vehicle width direction. For this reason, slant part 42 is arranged along top surface 4a of rear fender 4 such that central part 42c covers top surface 4a of rear fender 4 and that left depressed part 42a and right depressed part 42b sandwich top surface 4a of rear fender 4 from the left and right sides in the vehicle width direction.

Moreover, as shown in FIG. 8, central part 42c in the vehicle width direction of slant part 42 is also curved in the front and rear direction along the curved shape of top surface 3b of the rear wheel and top surface 4a of the rear fender, which are arranged below slant part 42, in such a way as to cover top surface 3b of the rear wheel and top surface 4a of the rear fender. For this reason, slant part 42 is arranged along and covers top surface 4a of the rear fender. In this manner, since slant part 42 is curved in the vehicle width and front and rear directions to cover top surface 4a of the rear fender, slant part 42 can be arranged close to top surface 4a of the rear fender (refer to FIG. 2). Nothing is arranged between slant part 42 and top surface 4a of the rear fender opposite to slant part 42.

Bottom part 41 of fuel tank 40 further includes an extending part 43 having its rear end connected to, and extending nearly horizontally forward from, the bottom end of slant part 42. Extending part 43 is located at the lowest position of bottom part 41 and is arranged before rear wheel 3 and below the rear part of first sitting part 21 of seat 20.

A part of extending part 43 on the right side in the vehicle width direction is depressed downward from a part on the left side to form a reservoir part 43a located at the lowest position of extending part 43. Thus, when fuel is stored in tank 40, a height from reservoir part 43a to the fuel liquid level above it is greater than a height from the other part of bottom part 41 (including a part except for reservoir part 43a and slant part 42) to the fuel liquid level above it. Therefore, fuel left in tank 40 is reserved in reservoir part 43a.

In this manner, fuel tank 40 has an upper part of extending part 43 for securing a fuel volume by extending its height and an upper part of slant part 42 to be arranged in a limited space above rear wheel 3 and below seat 20 by contracting its height.

Fuel tank 40 has a front raised part 47a and a rear raised part 47b that are parts of top surface part 44, on which front load receiving part 90 and rear load receiving part 91 are arranged, and are raised to a side opposite to seat 20 from their surrounding surfaces. That is, front raised part 47a is a part of the front part of top surface part 44, which is a part which extends from a part against which right front load receiving part 90b abuts to a part against which left front load receiving part 90a abuts, and which is a part which is raised continuously in the vehicle width direction; and rear raised part 47b is a part of the rear part of top surface part 44, which is a part whose center in the vehicle width direction, against which the bottom of rear load receiving part 91 abuts, is raised.

Parts 47a and 47b of top surface part 44 are raised upward and are therefore especially increased in rigidity. Front raised part 47a receives the load applied to first sitting part 21 via front load receiving part 90 and rear raised part 47b receives the load applied to second sitting part 22 via rear load receiving part 91. The top surfaces of raised parts 47a and 47b are formed into nearly flat surfaces so as to be in close contact with front load receiving part 90 and rear load receiving part 91. The top surface of rear raised part 47b is located at the highest position of the surface of fuel tank 40.

Fuel tank 40 has a pump arranging part 45, on which discharge port 52 of fuel pump unit 50 is arranged, on its top surface part 44. Pump arranging part 45 includes a circular pump inserting opening 45a for inserting a part of fuel pump unit 50 into tank 40 formed in a part of slant part 42 located above left depressed part 42a (refer to FIG. 9). Discharge part 52 of fuel pump unit 50 is arranged within a range of pump inserting opening 45a. A plurality of fixing holes 45b, in which fixing bolt members 320 (refer to FIG. 6) for fixing a part of fuel pump unit 50 to top surface part 44 are arranged, are formed around pump inserting opening 45a.

Fuel tank 40 also has a fuel supply port part 46, in which a nearly circular fuel injection port 46a for injecting fuel into tank 40 is formed, on top surface part 44. Fuel supply port part 46 has a cylindrical tube filler part 46b passed through fuel injection port 46a and fixed to top surface part 44 and extending in the up and down direction. Tube filler part 46b extends in the up and down direction in such a way that its top end projects upward from the surrounding top surface part 44 and that its bottom end is located in fuel tank 40.

The top surface of fuel supply port part 46 is located further upward of the vehicle than is the top surface of discharge part 52 of fuel pump unit 50. That is, in fuel tank assembly 200 shown in FIG. 6, fuel supply port part 46 has a cap part 46d fitted in a projecting manner on top surface part 44 to cover the top of tube filler part 46b. The top surface of cap part 46d is located above projecting part 52a and nozzle part 52b of discharge part 52. Thus, projecting part 52a and nozzle part 52b are effectively protected from deflection of seat 20 and the like by fuel supply port part 46 which has a comparatively high rigidity.

Fuel supply port part 46 is located between the left and right front load receiving parts 90a and 90b in the vehicle width direction. That is, as shown in FIG. 3, the central position 46c of fuel injection port 46a is located between an imaginary straight line 90d drawn rearward from a left end of left front load receiving part 90a and an imaginary straight line 90e drawn rearward from a right end of right front load receiving part 90b.

Both fuel supply port part 46 and pump arranging part 45 are arranged rearward of front raised part 47a and forward of rear raised part 47b. That is, as shown in FIG. 3, fuel supply port part 46 and pump arranging part 45 are arranged rearward of an imaginary straight line 90f drawn from the front end of front load receiving part 90 and forward of an imaginary straight line 90g drawn from the rear end of rear load receiving part 91. Fuel supply port part 46 and pump arranging part 45 are arranged side by side in the vehicle width direction and are arranged rearward, respectively, of right front load receiving part 90b and left front load receiving part 90a.

Fuel pump unit 50 also includes: a body part 51 generating power for sucking fuel in tank 40 to the outside of tank 40; a suction part 53 for sucking fuel in tank 40 into body part 51;

discharge part 52 for discharging fuel sucked into body part 51 to the outside of tank 40; a disk-shaped flange part 54 fixed to tank 40; and a detection part 55 for detecting the amount of fuel in tank 40.

Body part 51 is formed in the shape of a nearly circular cylinder slanting forward and downward from the bottom of discharge part 52. Body part 51 houses a motor shaft (not shown) extending in its longitudinal direction, an impeller (not shown) rotating around the motor shaft to suck fuel from suction part 53, and a motor part (not shown) generating power for rotating the impeller.

Body part 51 extends in fuel tank assembly 200 such that its longitudinal direction is in close agreement with the slant direction of slant part 42 of fuel tank 40 and is arranged above and close to slant part 42. Here, the slant direction of slant part 42 is tangent to the curved shape of a part of slant part 42 in the front and rear direction. Body part 51 is arranged above slant part 42 such that the longitudinal direction of its motor shaft is in close agreement with a direction tangent to the curved shape of central part 42c. Thus, an impact applied in the longitudinal direction of the motor shaft in body part 51 by vibrations in the up and down direction of the vehicle body is reduced as compared with a case where body part 51 is arranged upright in the up and down direction. The length in the slant direction of slant part 42 of is greater than the length in the longitudinal direction of body part 51.

Body part 51 is arranged above a part at the lowest position of slant part 42. That is, body part 51 is arranged on left depressed part 42a (refer to FIG. 9) of slant part 42. In this case, at least a part of body part 51 may be located below central part 42c of slant part 42.

Since body part 51 has the greatest length in its longitudinal direction and is slanted to extend along slant part 42, the upper part of slant part 42 can be reduced in thickness. As a result, the rear part of fuel tank assembly 200 can be arranged in a limited space formed above rear wheel 3 and below seat 20.

Suction part 53 of fuel pump unit 50 houses a filter (not shown) for filtering dust from fuel that is sucked from tank 40 into body part 51. Suction part 53 is coupled to and extends downward from the bottom end of body part 51, and extends also to the right side in the vehicle width direction and has a tip end part 53a slanted downward.

Tip end part 53a of suction part 53 is located above reservoir part 43a of extending part 43 of fuel tank 40. Suction part 53 is arranged only a small distance away from extending part 43.

Discharge part 52 of fuel pump unit 50 is arranged above the top end of body part 51. That is, a part located from the top end of body part 51 to discharge part 52 extends upward toward seat 20 from the top end of body part 51. Discharge part 52 has a projecting part 52a fitted in a projecting manner on flange part 54 and a cylindrical nozzle part 52b extending rearward nearly horizontally from projecting part 52a. Discharge port 52c is formed at the tip of nozzle part 52b and one end of fuel hose 201 is coupled to the tip of nozzle part 52b (refer to FIG. 2).

Discharge part 52 is fitted in a projecting manner to a part within a range of pump inserting opening 45a of top surface part 44 of fuel tank 40 opposite to seat 20. Discharge part 52 is arranged rearward of first sitting part 21 and below middle part 23 between first sitting part 21 and second sitting part 22 of seat 20. That is, as shown in FIG. 3, projecting part 52a and nozzle part 52b are rearward of imaginary straight line 90f drawn in the vehicle width direction from the front end of front load receiving part 90 and forward of imaginary straight line 90g drawn from the rear end of rear load receiving part 91.

As a result, discharge part 52 is arranged in a space above rear wheel 3 and rear fender 4, below seat 20, above fuel tank 40, and between front load receiving part 90 and rear load receiving part 91. Thus, when a driver sits on first sitting part 21 and a passenger sits on second sitting part 22, first sitting part 21 is deflected between front load receiving part 90 and front support part 92 and second sitting part 22 is deflected between rear load receiving part 91 and rear support part 93, so that discharge part 52 is effectively protected from deflection of seat 20.

Moreover, discharge part 52 is located between left front load receiving part 90a and right front load receiving part 90b in the vehicle width direction. That is, as shown in FIG. 3, projecting part 52a and nozzle part 52b are between imaginary straight line 90d drawn rearward from the left end of left front load receiving part 90a and imaginary straight line 90e drawn rearward from the right end of right front load receiving part 90b. Thus, discharge part 52 is also effectively protected in the vehicle width direction from displacement of seat 20 caused by the load.

Furthermore, projecting part 52a and nozzle part 52b and fuel hose 201 extending rearward from nozzle part 52b are below the top surface of rear raised part 47b of fuel tank 40. Nozzle part 52b and fuel hose 201 extend to the left side of rear raised part 47b. Projecting part 52a, nozzle part 52b, and fuel hose 201 project above top surface 44 (including front raised part 47a) except for rear raised part 47b.

Flange part 54 of fuel pump unit 50 extends in the shape of a disk around and from the bottom end of projecting part 52a of discharge part 52 above the top end of body part 51. A connector part 56 on which a terminal (not shown) for supplying electric power from a generator (not shown) mounted in motorcycle 1 to fuel pump unit 50 is fitted in a projecting manner on flange part 54 next to projecting part 52a (see FIG. 12).

Flange part 54 surrounds pump inserting opening 45a and is pressed onto pump arranging part 45 from above by a pressing member 321. Flange part 54 and pressing member 321 are fastened to pump arranging part 45 together by a plurality of bolt members 320. Connector part 56 on flange part 54 is covered with a terminal coupler 57, and a harness 58 connected to the terminal of connector part 56 for supplying electric power extends to the left side in the vehicle width direction from terminal coupler 57 (refer to FIG. 4). Connector part 56, just as is discharge part 52, is arranged between left and right front load receiving parts 90a and 90b.

Detection part 55 of fuel pump unit 50 has a float part 55a (FIG. 11) that floats in the fuel in tank 40. Detection part 55 detects the amount of remaining fuel on the basis of the position of float part 55a floating up and down according to the level of fuel in tank 40.

The angle formed by the longitudinal direction of discharge part 52 and the longitudinal direction of body part 51 is fixed. That is, discharge part 52 and body part 51 are coupled to each other such that the angle formed by the up and down direction in which discharge part 52 extends and the slant direction in which body part 51 extends is not changed.

Fuel tank assembly 200 is assembled by inserting fuel pump unit 50 into fuel tank 40 from its bottom side and by fixing a part of fuel pump unit 50 to tank 40. That is, first, fuel pump unit 50 is inserted into tank 40 from the suction part 53 side through pump inserting opening 45a of tank 40. Suction part 53 and body part 51 are slid downward along slant part 42 located below pump inserting opening 45a. With this, suction part 53 is arranged above extending part 43 located at the lowest position of bottom part 41 of fuel tank 40 and body part 51 is arranged above and extends along the slant of slant part 42. Flange part 54 is fastened to a part of pump arranging part 45 surrounding pump inserting opening 45a by bolt members 320 above the top end of body part 51 to fix fuel pump unit 50 to fuel tank 40. As a result, in fuel tank 40, only suction part 53 and a part of detection part 55 are arranged above extending part 43 and the other parts of fuel pump unit 50 including body part 51, flange part 54, and discharge part 52 are arranged above slant part 42.

Fuel tank assembly 200 assembled in this manner is fixed to parts of left and right seat rails 14. That is, a left front stay 300 and a left rear stay 301 for supporting the left side of fuel tank 40 by two front and rear points are fixed to left seat rail 14a, and a right front stay 302 and a right rear stay 303 for supporting the right side of fuel tank 40 by two front and rear points are fixed to right seat rail 14b. Collar parts 48 of fuel tank 40 are fixed to these four stays, so that fuel tank assembly 200 is fixed to and arranged between left and right seat rails 14.

Tank cover 60 is a sheet member made of rubber and formed to follow the shape of and to cover top surface part 44 of fuel tank 40. Tank cover 60 covers the major parts arranged above seat rail 14 except for fuel supply port part 46, rear raised part 47b and the rear end part of fuel tank 40, and discharge part 52. Tank cover 60 has a pair of left and right fin parts 61 covering parts of left and right seat rails 14a and 14b that are arranged outside of fuel tank 40 in the vehicle width direction. Tank cover 60 prevents fuel spilled when injected into fuel tank 40 from flowing down tank 40. Tank cover 60 has a plate-shaped stemming part 62 extending in the front and rear direction to separate fuel supply port part 46 from discharge part 52. Thus, stemming part 62 prevents fuel spilled near fuel supply port part 46 of from flowing to the discharge part 52 side. Moreover, as described above, left and right front load receiving parts 90a and 90b are fitted together with the other parts in a manner projecting toward seat 20 to such a part of tank cover 60 that covers front raised part 47a of fuel tank 40.

Figure 13:
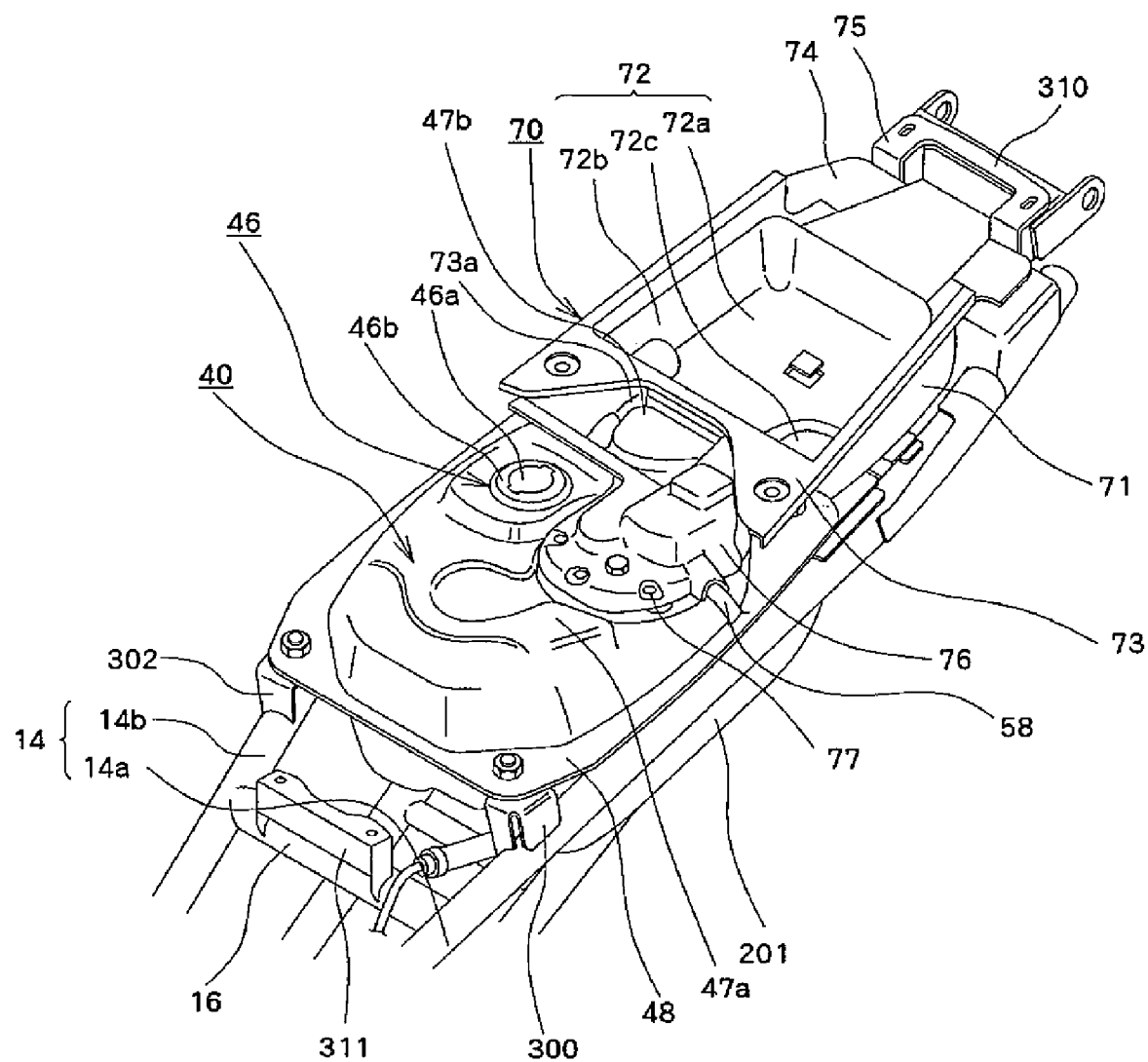
FIG. 13 is a perspective view of a state where a protection member is further arranged on the vehicle body of FIG. 4.
Figure 14:
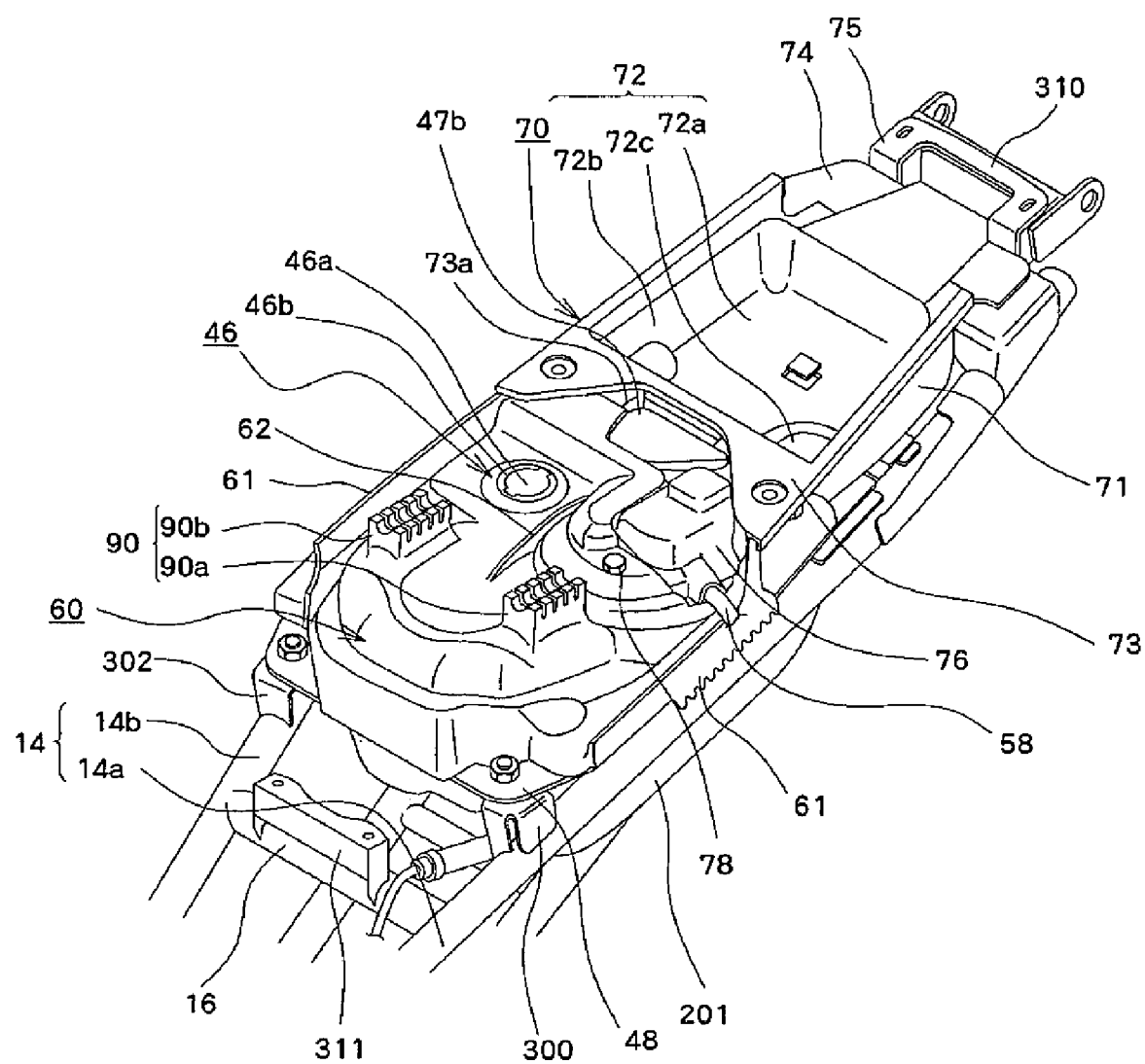
FIG. 14 is a perspective view of a state where the protection member is further arranged on the vehicle body of FIG. 5.
Figure 15:
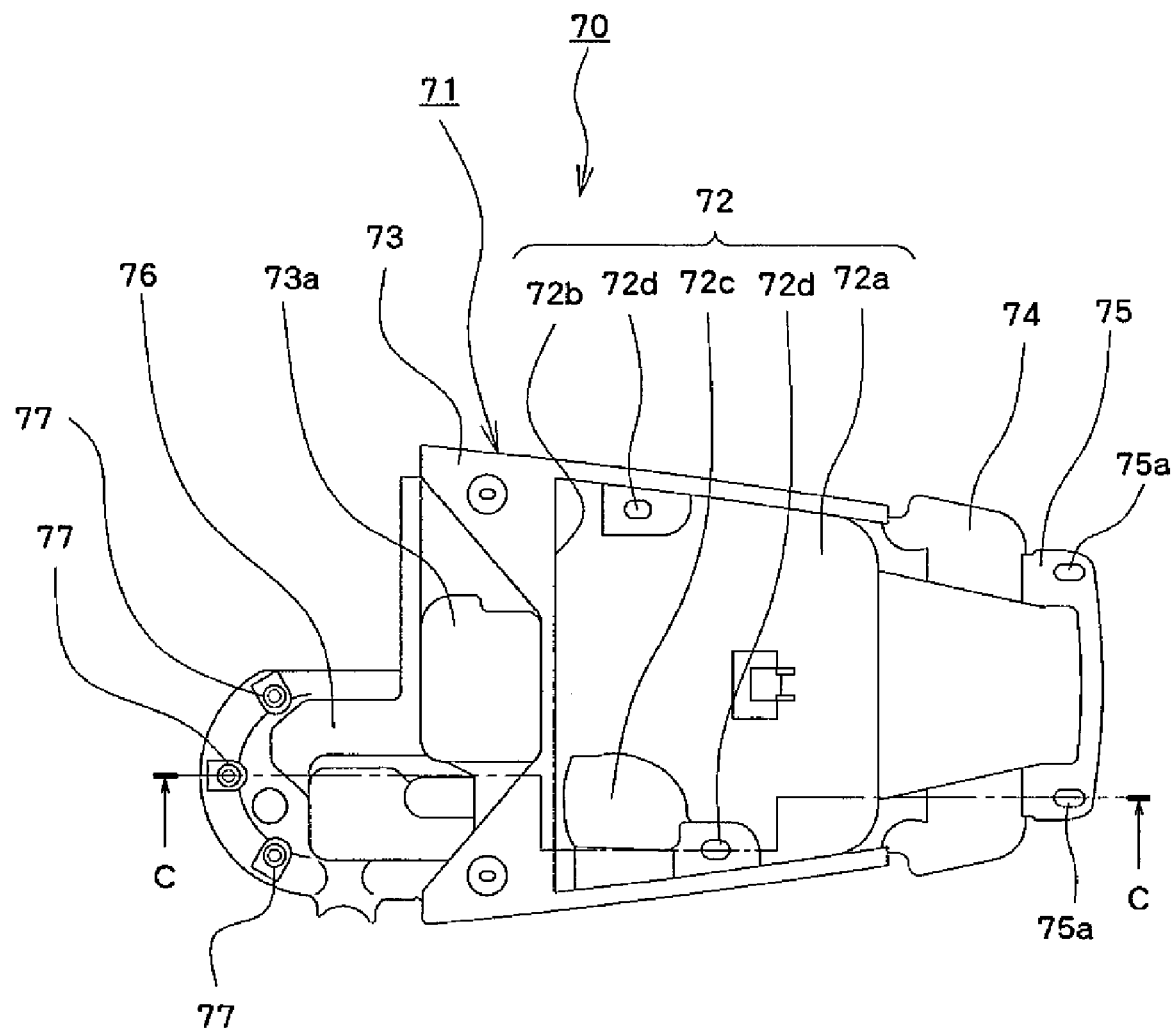
FIG. 15 is a plan view of the protection member according to the invention.
Figure 16:
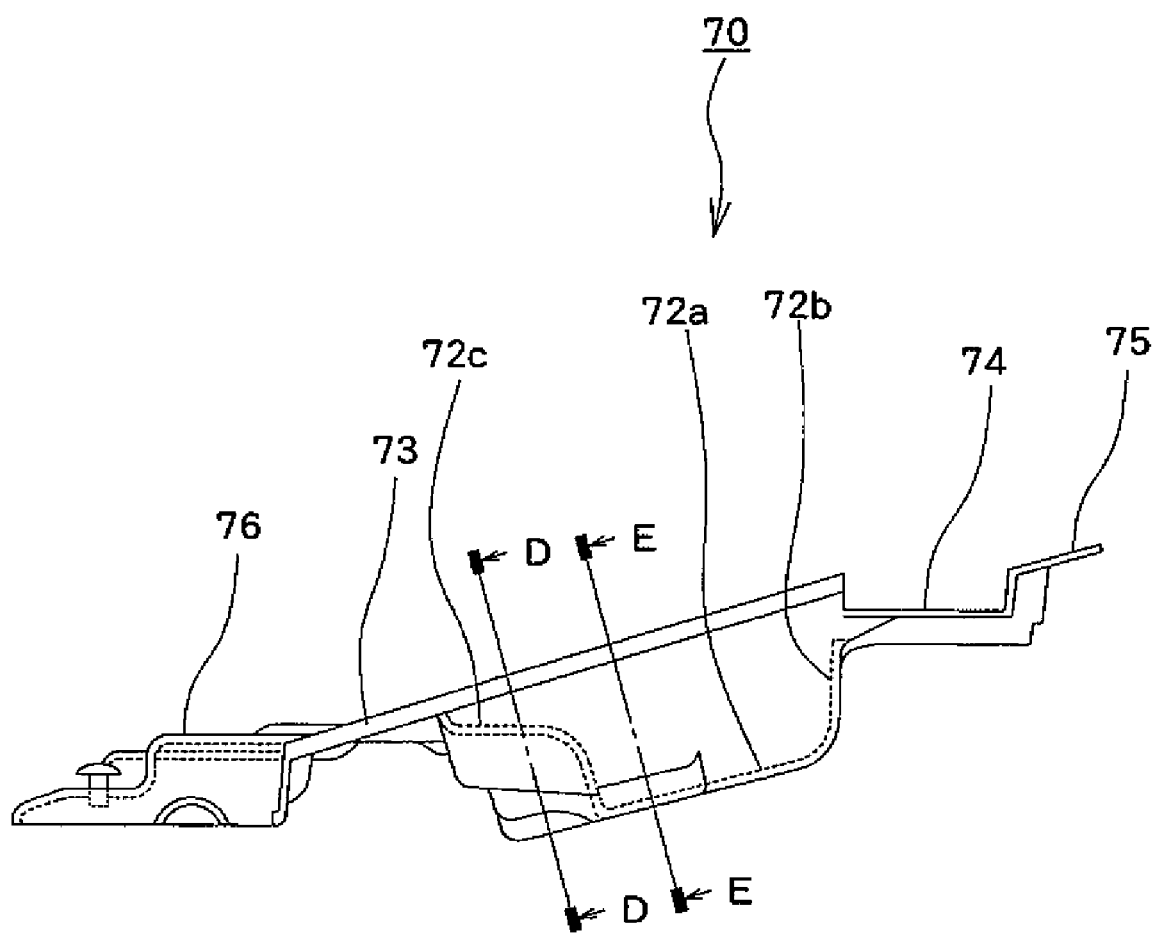
FIG. 16 is a left side view of the protection member of FIG. 15.
Figure 17:
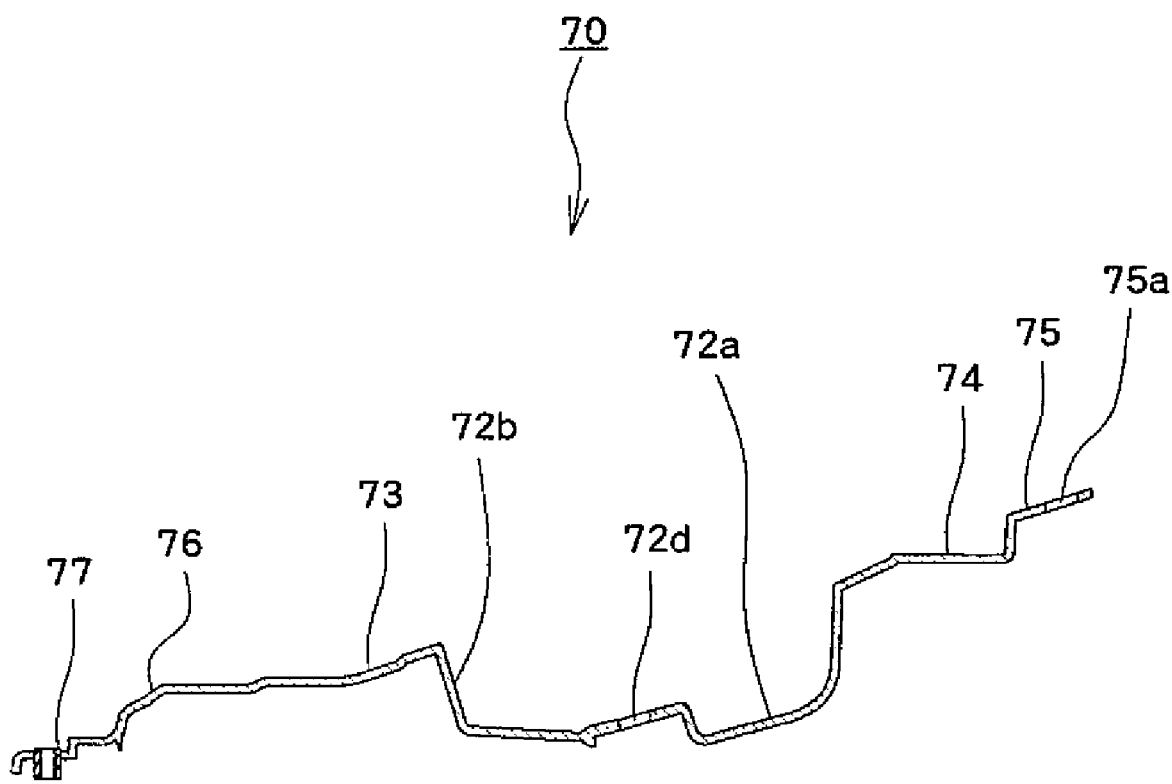
FIG. 17 is a cross-sectional view of the protection member taken along line C-C of FIG. 15.
Figure 18:
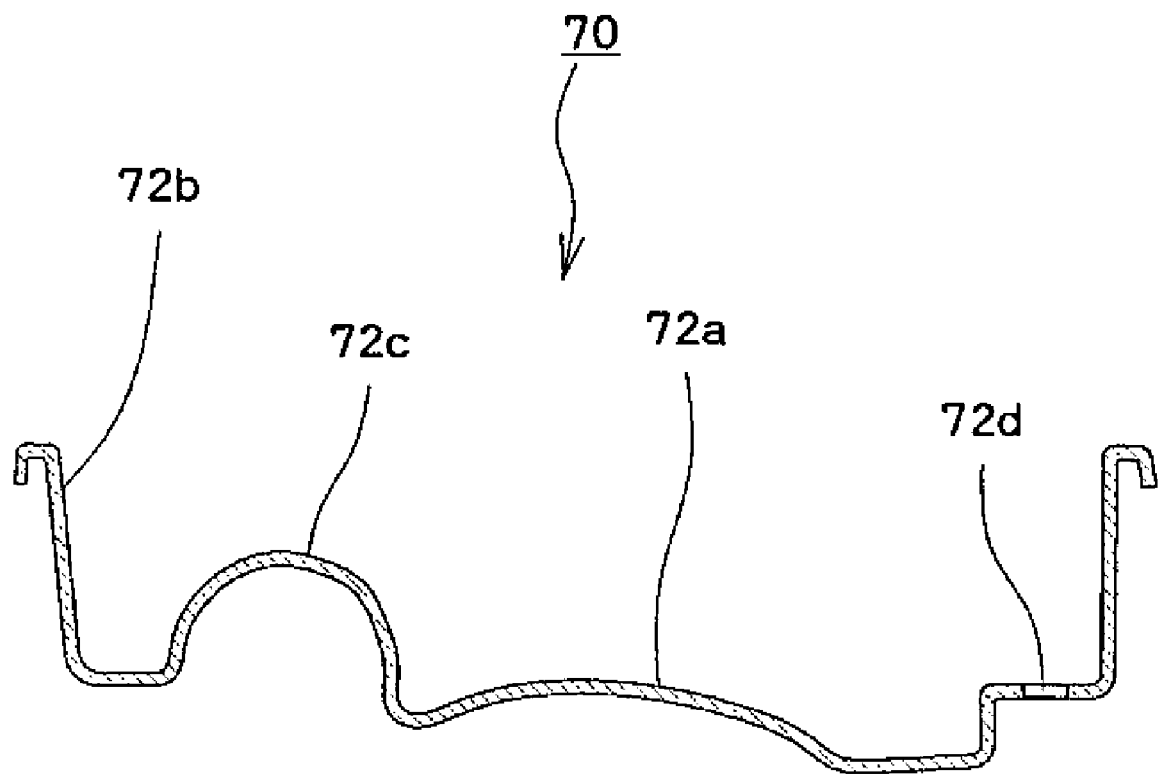
FIG. 18 is a cross-sectional view of the protection member taken along line D-D of FIG. 16.
Figure 19:
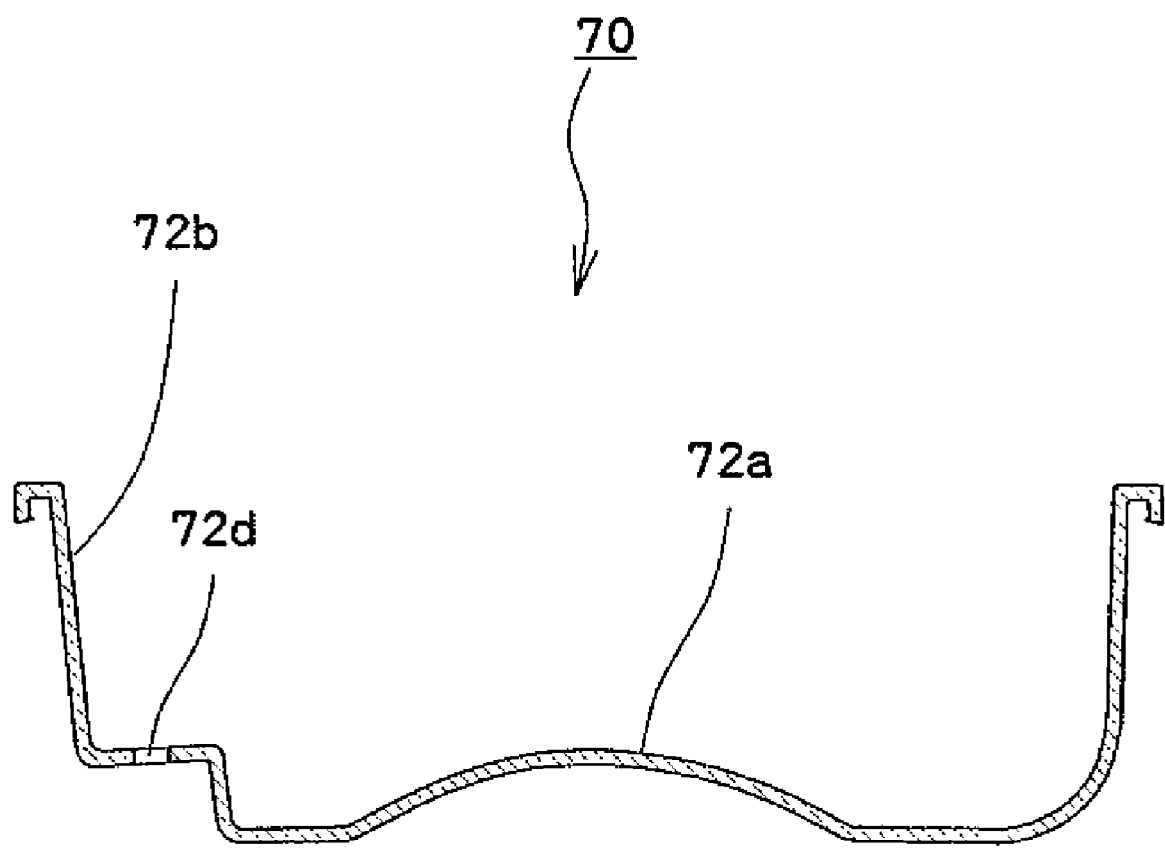
FIG. 19 is a cross-sectional view of the protection member taken along line E-E of FIG. 16.

Protection member 70 is now described in detail. FIG. 13 shows protection member 70 arranged on the vehicle body shown in FIG. 4. FIG. 14 shows protection member 70 arranged on the vehicle body shown in FIG. 5. FIGS. 15 and 16 are, respectively, a plan view and a left side view of protection member 70. FIG. 17 is a cross-sectional view of protection member 70 taken along line C-C of FIG. 15. FIGS. 18 and 19 are cross-sectional views of protection member 70 taken along, respectively, line D-D and line E-E of FIG. 16.

Protection member 70 is made of resin and has a base member 71 fixed to left and right seat rails 14a and 14b and a pump cover part 76 formed integrally with base member 71 and covering discharge part 52 arranged on fuel tank 40.

Base member 71 is a storage box having a storage part 72 for storing an object and is formed in a depressed downward shape. Storage part 72 has a bottom part 72a on which an object can be placed and a wall part 72b extending upward from bottom part 72a to surround bottom part 72a. Bottom part 72a slants forward and downward to follow left and right seat rails 14a and 14b in the front and rear direction. Moreover, the length in the vehicle width direction of bottom part 72a is nearly equal to the distance between left seat rail 14a and right seat rail 14b. Left and right fixing holes 72d for fixing base member 71 to left and right seat rails 14a and 14b are formed in the left and right ends of bottom part 72a.

A rear plate part 74 extends rearward from the top end of the rear part of wall part 72b. Rear support part 93, projecting from the bottom surface of seat 20 as shown in FIGS. 2 and 3, abuts against rear plate part 74 from above. Thus, rear plate part 74 receives a part of the load applied to seat 20 via rear support part 93.

A rear end plate part 75 extends further rearward from the rear end of rear plate part 74. The length in the vehicle width direction of rear end plate part 75 is nearly equal to the distance between the rear ends of left and right seat rails 14a and 14b. Left and right fixing holes 75a for fixing base member 71 to left and right seat rails 14a and 14b are formed in the left and right ends of rear end plate part 75.

Base member 71 is arranged astride left and right seat rails 14a and 14b in the vehicle width direction and both ends thereof are fixed to seat rails 14a and 14b. That is, as shown in FIGS. 4 and 5, rearward of fuel tank 40, left rear end stay 304 is fixed to left seat rail 14a further rearward of left rear stay 301 and right rear stay 303 is fixed to right seat rail 14b. The left and right ends of bottom part 72a of base member 71 are fixed to left rear end stay 304 and right rear end stay 303 by two bolt members 72e (refer to FIG. 2) passed through fixing holes 72d. As a result, base member 71 is fixed to left and right seat rails 14a and 14b via, respectively, left rear end stay 304 and right rear stay 303.

A rear end support member 310 is fixed to and arranged astride the rear end parts of left and right seat rails 14a and 14b. The left and right ends of rear end plate part 75 are fixed to rear end support member 310 by two bolt members 75b passed through fixing holes 75a (refer to FIG. 2). As a result, base member 71 is fixed to left and right seat rails 14a and 14b via rear end support member 310. In this manner, base member 71 extends astride left and right seat rails 14a and 14b in the vehicle width direction. Base member 71 is next to and rearward of fuel tank 40.

A hose cover part 72c is formed in bottom part 72a and wall part 72b to cover a turning-back part 201a of fuel hose 201 that turns back forward at the rear end of fuel tank 40. Hose cover part 72c bulges out rearward from the front part of wall part 72b to follow turning-back part 201a of fuel hose 201. Turning-back part 201a of fuel hose 201 is arranged outside hose cover part 72c so as to follow the bulging shape of hose cover part 72c. Since hose cover part 72c bulges into the storage space of storage part 72, the number of parts is reduced and motorcycle 1 is slimmer in the vehicle front and rear direction.

Fuel hose 201 turns back forward and wraps from above to below the rear end of collar part 48 of fuel tank 40 and extends forward along the left side of fuel tank 40 between seat rail 14 and back stay 13. That is, fuel hose 201 extends from discharge part 52 of fuel tank assembly 200 to injector 32 of engine 30 without extending outside seat rails 14 in the vehicle width direction. For this reason, motorcycle 1 is slimmer in the vehicle width direction.

A front plate part 73 slants forward and downward from the top end of the front part of wall part 72b. The length in the vehicle width direction of front plate part 73 is nearly equal to the distance between left and right seat rails 14a and 14b. An opening 73a in which rear raised part 47b of fuel tank 40 is arranged is formed in the central part of front plate part 73. That is, as shown in FIGS. 13 and 14, rear raised part 47b is exposed in opening 73a of front plate part 73, and rear load receiving part 91 projects from the bottom surface of seat 20 and abuts directly against rear raised part 47b.

Pump cover part 76 of protection member 70 is connected with and extends forward from the front end of front plate part 73. A left nearly-half part of front plate part 73 extends forward and forms pump cover part 76. That is, pump cover part 76 is formed integrally with front plate part 73a, which is longer than the length in the vehicle width direction than pump cover part 76 and storage part 72, so that an impact to pump cover part 76 is effectively diffused to base member 71 having front plate part 73 and storage part 72.

Pump cover part 76 has depressions and projections corresponding to the shapes of: projecting part 52a and nozzle part 52b of the discharge part 52; fuel hose 201; a terminal coupler 57, harness 58; and bolt members 320 for fixing flange part 54 to top surface part 44, which are arranged on fuel tank 40, and is arranged above and close to and covers these members. Pump cover part 76 is fixed to tank cover 60 by a screw member 78.

A plurality of cylindrical bumper members 77 capable of abutting against the top ends of bolt members 320 are arranged at positions of pump cover part 76 opposite to bolt members 320 fixing flange part 54 to fuel tank 40. Bumper members 77 are arranged above and close to bolt members 320 at a specified distance from bolt members 320 so that they can abut against opposite bolt members 320. Bumper members 77 are made of rubber and hence can be elastically deformed by a smaller load than the pump cover part 76 made of resin. Thus, for example, when pump cover part 76 is deflected downward by an impact to pump cover part 76, bumper members 77 abut against bolt members 320 and hence can absorb the impact effectively. That is, bumper members 77 reduce the impact to the part of top surface part 44 of the fuel tank 40 that surrounds pump inserting opening 45a and has a comparatively small rigidity. Here, even when pump cover part 76 does not receive an impact, bumper members 77 may abut against bolt members 320 opposed to them.

Figure 20:
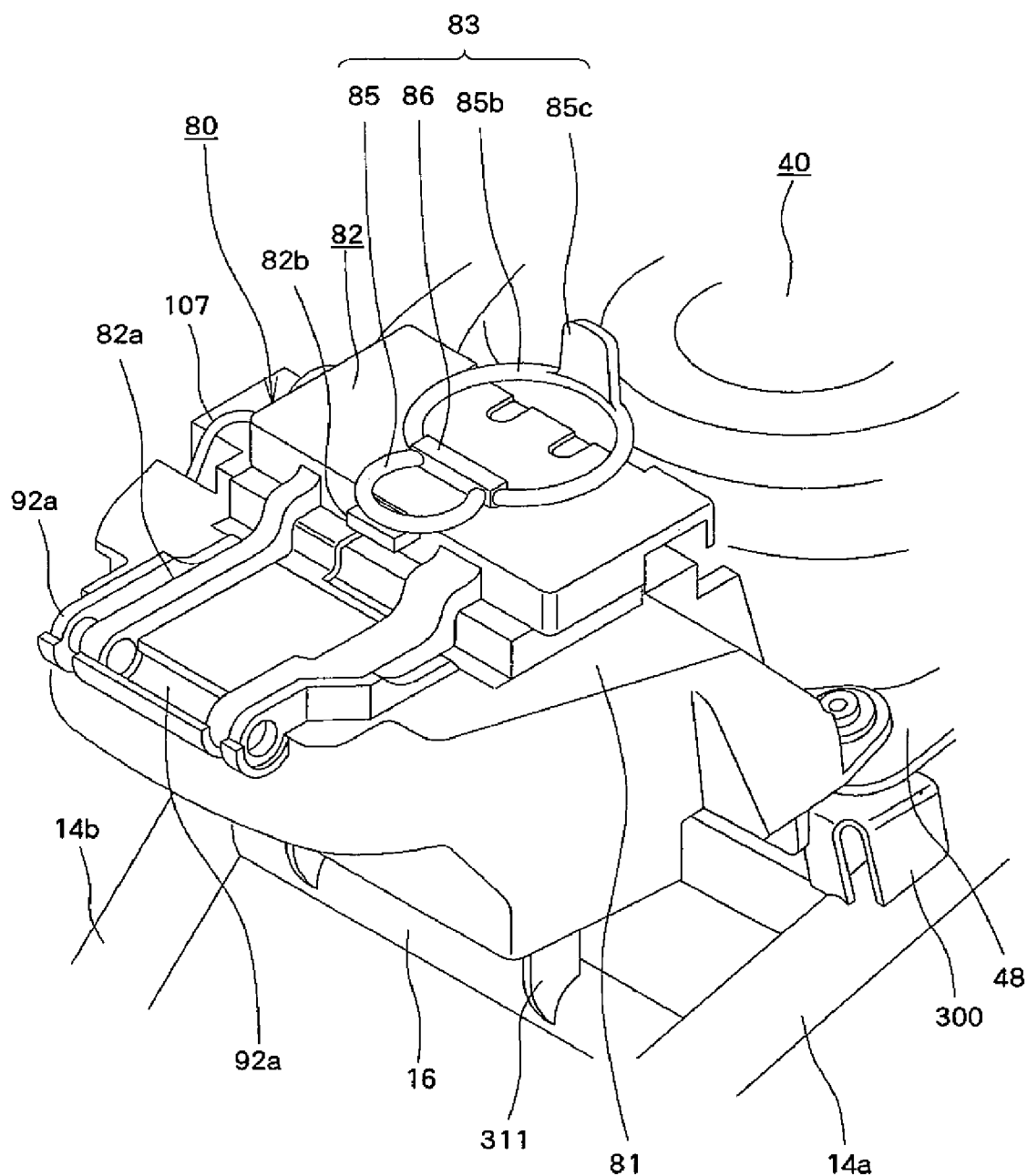
FIG. 20 is a perspective view of a battery case according to the invention.
Figure 21:
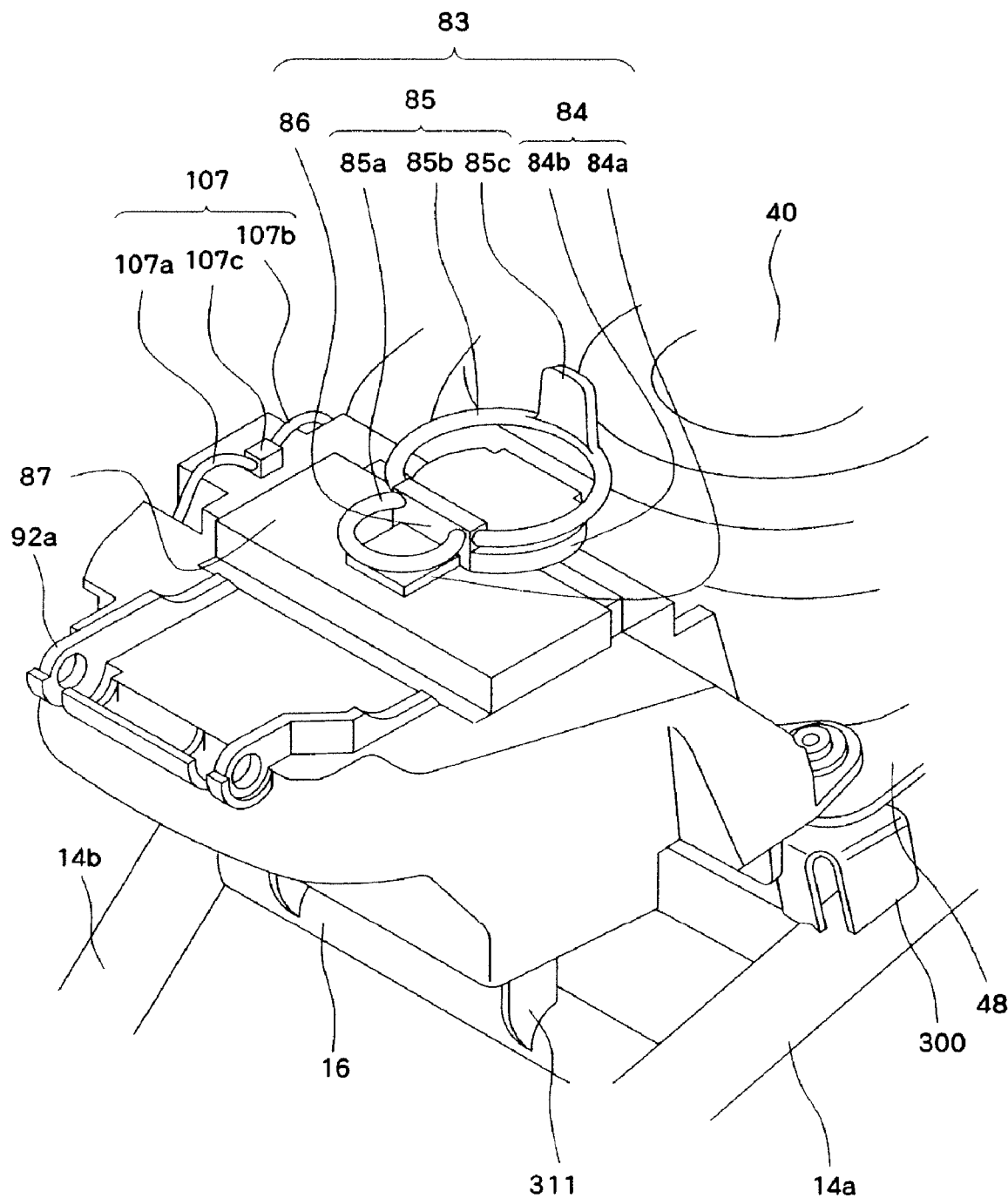
FIG. 21 is a perspective view of a state where a top cover part of the battery case of FIG. 20 is removed.

Battery case 80 is now described in detail. FIG. 20 shows battery case 80 and FIG. 21 is shows battery case 80 with its top cover part 82 removed.

Battery case 80 opens upward and has a case part 81 in which a battery 87 is stored. A top cover part 82 is arranged above case part 81, and a fixing part 83 fixes top cover part 82 to case part 81.

Battery case 80 is fixed to a part of vehicle body frame 10 forward of fuel tank 40 and is arranged next to tank 40. That is, a cross member 16, which is a part of vehicle body frame 10 and extends in the vehicle width direction to connect left and right seat rails 14a, 14b, is arranged on parts of left and right seat rails 14a, 14b that extend forward of fuel tank 40. A front end support member 311 for supporting battery case 80 is fixed to cross member 16 (refer to FIG. 4). Case part 81 is fixed to front end support member 311, whereby battery case 80 is fixed to cross member 16 via front end support member 311. Moreover, case part 81 has a plate-shaped rear projecting part 81a fitted in a projecting manner to the rear side of case part 81 (refer to FIGS. 2 and 3).

Top cover part 82 has a front end part 82a supported turnably by hinge part 92a of front support part 92. That is, top front end part 82a is turned around hinge shaft 92b (refer to FIG. 2) of hinge part 92a to open or close top cover part 82. Top cover part 82 has a plate-shaped front projecting part 82b fitted projecting from the front side of top cover part 82.

Fixing part 83, as shown in FIG. 21, has a plate-shaped base part 84 arranged on the bottom surface side of top cover part 82, a ring-shaped band part 85 arranged on the top surface side of top cover part 82, and a through part 86 passing through the central part of top cover part 82 in the up and down direction. Fixing part 83 is made of rubber and has base part 84, band part 85, and through part 86 formed integrally with each other.

Base part 84 has a front base part 84a extending forward from the bottom end of through part 86 and a rear base part 84b extending rearward from the bottom end of through part 86 and is arranged between the bottom surface of top cover part 82 and battery 87 in case part 81. Front base part 84a and rear base part 84b differ in height and the height of front base part 84a is smaller than that of rear base part 84b. The top surfaces of front base part 84a and rear base part 84b abut against the bottom surface of top cover part 82 and their bottom surfaces abut against the top surface of battery 87 in case part 81. Front base part 84a and rear base part 84b press down battery 87 in case part 81 on the bottom surface side of top cover part 82.

Band part 85 has a ring-shaped front band part 85a extending forward from the top end of through part 86 and a ring-shaped rear band part 85b extending rearward from the top end of through part 86. Front band part 85a and rear band part 85b differ in diameter and the diameter of front band part 85a is smaller than that of rear band part 85b. A plate-shaped grip part 85c extending upward is formed on the rear end part of rear band part 85b.

Front band part 85a is retained by front projecting part 82b of top cover part 82 (refer to FIG. 2). That is, when front band part 85a is pulled and extended forward, the tip of its ring shape can be retained by front projecting part 82b of top cover part 82. As a result, fixing part 83 is fixed to top cover part 82. Moreover, rear band part 85b is retained by plate-shaped rear projecting part 81a fitted in a projecting manner to the rear side of case part 81 (refer to FIG. 2). That is, when rear band part 85b is extended rearward by gripping grip part 85c of rear band part 85b, the tip of its ring shape is retained by rear projecting part 81a of case part 81. As a result, top cover part 82 is fixed to case part 81 by fixing part 83.

A service terminal 107 is arranged below seat 20 and is exposed upward when seat 20 is turned upward and opened. Service terminal 107 is arranged on the right side in the vehicle width direction of top cover part 82 of battery case 80 and is used, for example, for checking electronic devices (not shown) such as a speed meter mounted in motorcycle 1. The tip of a plus-side harness 107a of service terminal 107 is removably connected to the tip of a minus-side harness 107b via a terminal cap part 107c.

A straddle-type vehicle according to the present invention is not limited to the embodiment described above. For example, slant part 42 of fuel tank 40 may not be slanted and curved in the front and rear direction. Instead, when fuel tank 40 is arranged forward of rotary shaft 3a of rear wheel 3, slant part 42 may slant forward straightly and downward. Moreover, for example, extending part 43 of fuel tank 40 may extend further downward from the bottom end of slant part 42 and be located at the lowest position of bottom part 41. Further, for example, extending part 43 may be curved in the vehicle width direction or in the front and rear direction. Still further, for example, fuel tank 40 may not have extending part 43. In this case, however, suction part 53 of fuel pump unit 50 should be arranged at the lowest position of bottom part 41 of fuel tank 40. That is, in this case, suction part 53 is arranged above and close to the lowest position of slant part 42.

Moreover, the number and the shape of front load receiving part 90 and rear load receiving part 91 are not limited to those described above. For example, when at least one of front load receiving part 90 and rear load receiving part 91 has two or three or more partial load receiving parts arranged separately from each other in the vehicle width direction, only rear load receiving part 91 may have a plurality of partial load receiving parts or both of front load receiving part 90 and rear load receiving part 91 may have a plurality of partial load receiving parts. In this case) the plurality of partial load receiving parts are not limited to those arranged side by side in the vehicle width direction but may be arranged, for example, at different positions in the front and rear direction.

Moreover, each of front load receiving part 90 and rear load receiving part 91 may be arranged singly. In this case, one front load receiving part 90 or one rear load receiving part 91 may not be arranged at the center in the vehicle width direction, but may be arranged toward either the right or left side.

Further, for example, front load receiving part 90 and rear load receiving part 91 may be fitted in a projecting manner to the seat 20 side or may be fitted in a projecting manner to the fuel tank 40 side. That is, front load receiving part 90 and rear load receiving part 91 may be formed integrally with, for example, tank cover 60, fuel tank 40, and seat 20 or may be formed separately from these parts. Moreover, front load receiving part 90 and rear load receiving part 91 are not limited to a shape of a rectangular cylinder but may be in the shape of, for example, a circular cylinder or a polygonal cylinder.

Still further, for example, front load receiving part 90 and rear load receiving part 91 may have a hinge part for supporting the shaft of seat 20 or another part turnably. That is, front load receiving part 90 may have a hinge part arranged at the front part of fuel tank 40 for supporting the shaft of the front part of seat 20 turnably. In this case, front load receiving part 90 may not be arranged on top surface part 44 opposite to seat 20 of fuel tank 40 but may be fitted in a projecting manner to a part of the surface of fuel tank 40.

Still further, front load receiving part 90 and rear load receiving part 91 are not limited to parts made of rubber. That is, for example, front load receiving part 90 and rear load receiving part 91 are formed of a material capable of being elastically deformed and of absorbing an impact to seat 20 when they are pressed by seat 20 deformed by a load. Specifically, for example, when front load receiving part 90 has a hinge part for turnably supporting the shaft of the front part of seat 20, front load receiving part 90 may be formed of metal and integral with or separate from fuel tank 40.

Still further, base member 71 of protection member 70 is not limited to the example described above, if it is a member fixed to vehicle body frame 10 and capable of diffusing an impact to pump cover part 76. That is, if base member 71 is, for example, a member fixed to a part of vehicle body frame 10 and arranged next to fuel tank 40 forward of or rearward of fuel tank 40, base member 71 is not limited to a special member. Specifically, for example, base member 71 may have a three-dimensional cubic shape, such as battery case 80, rear fender 4, and vehicle cover 100.

Still further, base member 71 may not be fixed to seat rail 14 but may be, for example, a member that is another part of vehicle body frame 10 and extends astride and is fixed to left and right frame parts. In this case, for example, base member 71 may longer than pump cover part 76 and have both ends fixed to the left and right vehicle body frames. Moreover, protection member 70 may be made of a material other than resin such as metal or the like capable of diffusing an impact to pump cover part 76.

Still further, fixing part 83 of battery case 80 may be formed of a material other than rubber, for example, another elastic material capable of extending and contracting reversibly. In addition, service terminal 107 may not be next to battery case 80 but may be, for example, below seat 20 such that service terminal 70 is exposed to be used when seat 20 is opened.

The particular embodiments of the invention described in this document should be considered illustrative, rather than restrictive. Modification to the described embodiments may be made without departing from the spirit of the invention as defined by the following claims.

The invention claimed is:

1. A straddle-type vehicle comprising:
   a fuel tank;
   a seat arranged at least partially above the fuel tank;
   a front load receiving part and a rear load receiving part arranged to extend between the fuel tank and the seat and to be spaced apart from one another in a front to rear direction of the vehicle; and
   a fuel pump unit having a discharging part arranged to discharge fuel in the fuel tank and to supply the fuel to an engine; wherein
   each of the front load receiving part and the rear load receiving part is defined by a damper part made of an elastically deformable material arranged to absorb an impact applied to the seat;
   the front load receiving part extends upward from an upper surface of the fuel tank;
   the rear load receiving part extends downward from a bottom surface of the seat; and
   the discharge part is located between the front load receiving part and the rear load receiving part.

2. The straddle-type vehicle as claimed in claim 1, wherein at least one of the front load receiving part and the rear load receiving part includes a plurality of partial load receiving parts that are spaced apart from each other in a vehicle width direction.

3. The straddle-type vehicle as claimed in claim 2, wherein the discharge part is located between the plurality of partial load receiving parts in the vehicle width direction.

4. The straddle-type vehicle as claimed in claim 2, wherein the plurality of partial load receiving parts are arranged side by side in the vehicle width direction.

5. The straddle-type vehicle as claimed in claim 1, wherein the fuel tank includes a raised part at a position that corresponds to at least one of the front load receiving part and the rear load receiving part.

6. The straddle-type vehicle as claimed in claim 1, further comprising a front support part arranged to support the seat at a position closer to the front of the vehicle than the front load receiving part, and a rear support part arranged to support the seat at a position closer to the rear of the vehicle than the rear load receiving part.

7. The straddle-type vehicle as claimed in claim 1, wherein the fuel tank has a fuel supply port arranged between the front load receiving part and the rear load receiving part.

8. The straddle-type vehicle as claimed in claim 7, wherein a top surface of the fuel supply port is higher than a top surface of the discharge part.

* * * * *